United States Patent [19]
Petersen

[11] Patent Number: 5,921,302
[45] Date of Patent: Jul. 13, 1999

[54] METHOD AND APPARATUS FOR TREE STUMP CLEARING

[76] Inventor: John M. Petersen, 2305 - 180th SE., Bothell, Wash. 98012

[21] Appl. No.: 08/683,365

[22] Filed: Jul. 18, 1996

[51] Int. Cl.$^6$ .................................................. A01G 23/06
[52] U.S. Cl. ..................... 144/334; 37/302; 144/24.12; 144/34.1
[58] Field of Search ................................. 30/379, 379.5; 37/301, 302; 144/24.12, 34.1, 334

[56] References Cited

U.S. PATENT DOCUMENTS

| | | | |
|---|---|---|---|
| 2,893,499 | 7/1959 | Shollenberger | 37/301 |
| 2,966,180 | 12/1960 | Bles | 144/24.12 |
| 3,461,927 | 8/1969 | Funari | 144/24.12 |
| 3,814,152 | 6/1974 | Pallari | 144/24.12 |
| 4,018,255 | 4/1977 | Diggs | 37/302 |
| 4,321,761 | 3/1982 | Hedblom | 37/301 |
| 4,517,755 | 5/1985 | Nicholson | 37/301 |
| 4,682,638 | 7/1987 | Becker | 144/24.12 |
| 5,179,985 | 1/1993 | Pallari | 144/24.12 |
| 5,490,340 | 2/1996 | Muncy | 37/302 |

*Primary Examiner*—W. Donald Bray
*Attorney, Agent, or Firm*—Robert B. Hughes; Hughes & Schacht

[57] ABSTRACT

A method and apparatus for removal of tree stumps, by first splitting the upper part of the stump with a splitting plate, and then utilizing a digging member to sever and/or dislodge roots of the stump from the ground strata. This apparatus is desirably provided as a splitting attachment to be connected to a bucket of a backhoe or trackhoe. Also, there is a saw plate mounted to the lower side of a splitting plate. First, the bucket is manipulated to have the saw plate cut a kerf in the upper part of the stump, and then the splitting member is moved through the kerf to split the stump. The stump sections that are removed have comparatively little dirt and rocks attached thereto, and these can be more easily burned, cut into chips, or transported.

27 Claims, 12 Drawing Sheets

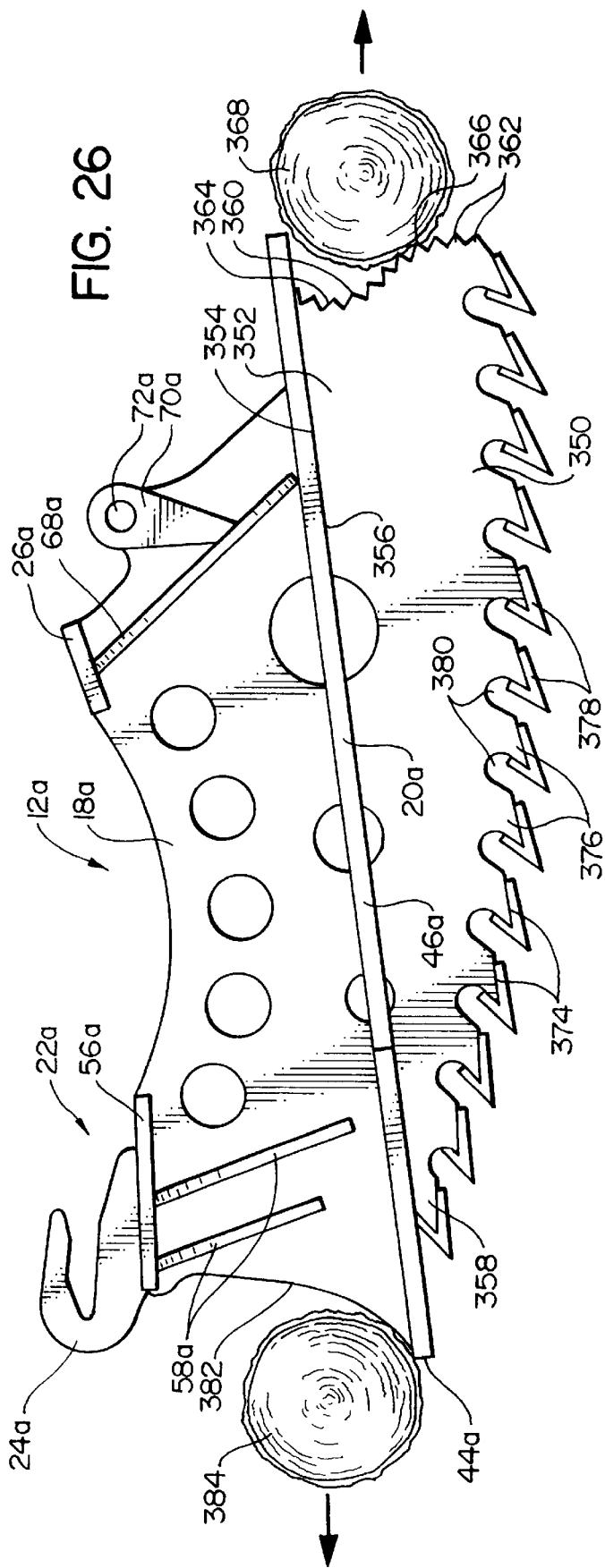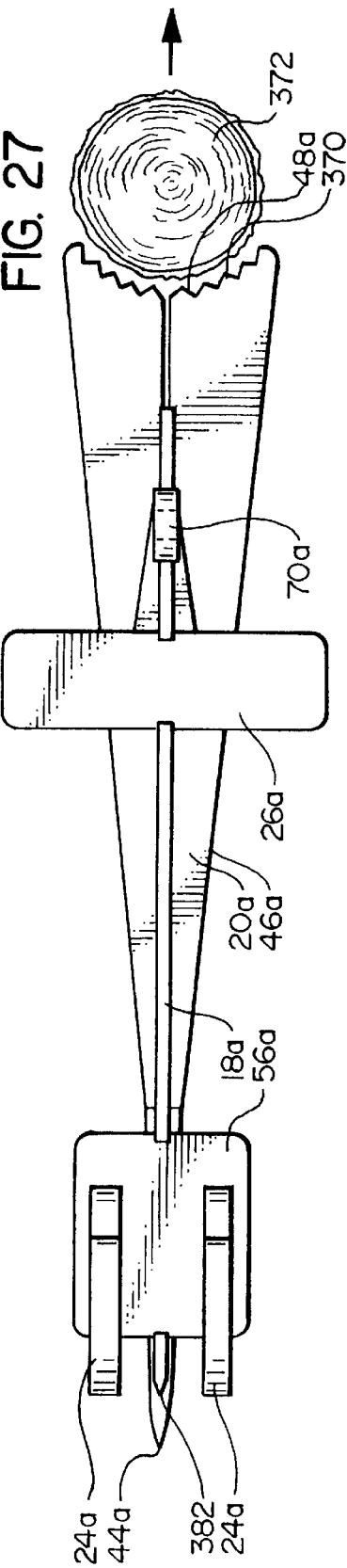

METHOD AND APPARATUS FOR TREE STUMP CLEARING

BACKGROUND OF THE INVENTION a) Field of the Invention

The present invention relates to a method and apparatus for removing tree stumps from the ground, and more particularly to such a method and apparatus where a splitting attachment can be used in conjunction with conventional equipment, such as a trackhoe, in a particularly effective manner to accomplish the splitting of the stump, the removal of the stump from the ground, and also the removal of rocks and dirt from the stump.

b) Background Art

When a tract of land has been logged, quite often it becomes necessary to remove the remaining stumps. One common way of accomplishing this is to simply use a bulldozer to dig around the roots of the stump and then push the stump out. Another method is to use a trackhoe to sever the roots and the trackhoe pulls the stump out of the ground hole in one piece by use of its bucket.

A search of the U.S. Patent literature has revealed a number of devices which are used for this purpose, these are the following:

U.S. Pat. No. 4,682,638 (Becker) shows what is called a "stump extracting tool" which can be mounted to an articulated arm such as the boom of a power shovel. This tool has a vertical splitting member 1 and a laterally extending triangular plate—like member having forwardly facing stepped cutting members. The vertical member splits the stump while the laterally extending cutting member makes a horizontal cut to remove a section of the stump.

U.S. Pat. No. 4,321,761 (Hedblom) shows an apparatus for uprooting tree stumps. There is a tool 7 which is mounted to a crane. This tool 7 comprises two members 23 and 24, these members 23 and 24 are positioned adjacent to one another and then are dug into the ground to a position below the stump. Then the member 24 is raised relative to the member 23 as the member 23 presses against the ground surface beneath the stump to uproot the stump.

U.S. Pat. No. 3,842,871 (Jureiwicz) shows a tree stump cutting assembly which is mounted behind a tractor. There is a blade member 1, having a bottom cutting edge 4, a rear cutting edge 5, and a forward cutting edge 6. The blade member 1 is pivotally mounted for limited angular movement to an arm 18 that is in turn connected to a hydraulically operated mechanism which can move the blade upwardly and downwardly. The hydraulic member 23 can be used to push the blade downwardly in a splitting action, or the tractor can be moved forwardly or rearwardly to accomplish the splitting motion.

U.S. Pat. No. 3,620,271 (Loyer) shows a stump splitting blade with a cutting edge on the front and bottom, secured to the rear of a heavy tracked vehicle. There is a hydraulic ram which forces the blade into the top of the stump. The vehicle then drags the blade down and forward to cut and split the stump.

U.S. Pat. No. 2,934,108 (Bles) shows an apparatus for cutting tree stumps and roots. There is a stump splitting tool that is mounted to a boom 14. The cutting tool 22 has at its lower end a forwardly directed cutting edge 32 which makes a vertical slice into the stump, and also has a laterally extending cutting edge 42 formed along a triangular horizontal plate 44. The tool is operated to cut slices off the tree stump (as shown in FIG. 4) where the vertical edge makes a vertical slice, and the slanted horizontal cutting edge 42 cuts the slice off at the lower horizontal edge thereof.

U.S. Pat. No. 2,966,180 is also issued to Bles, and this shows a modified form of the apparatus shown in the earlier Bles patent.

U.S. Pat. No. 2,528,170 (Peacock) shows a "stump dozer". The existing blade of a bulldozer is removed, and this stump removing blade is put in its place. There is a downwardly and forwardly slanting stump extracting blade 85, and there is a vertical wedge 18 mounted to the front of the blade. The manner in which the device is used is described in this patent as follows (column 3, beginning at line 8):

"The stump is then pushed out, much in the manner that a hog roots. The blade goes down under the stump, and then as the machine pushes forward, the unit is moved up by the cable or hydraulic power unit (not shown) operating the A frame of the tractor. The stump is then left on top of the ground and is either pulled or pushed to the burning pile or loaded on a truck for sale.

"Some of these stumps are so large that a dump truck cannot haul them. For this reason, I have provided the splitting wedge device mounted to the pusher, so that the stump is in smaller pieces when it has been removed from the ground. Thus, facilitating handled."

SUMMARY OF THE INVENTION

The method and apparatus of the present invention enables tree stumps to be removed from the ground in a particularly effective manner, in a manner that the upper part of the tree stump is split along one or more splitting planes, and then the stump is dislodged from its ground embedded position so that it can be moved out of the ground in sections.

In addition to enabling this to be removed more quickly and effectively, there are other additional benefits. For example, much of the dirt and rocks that would ordinarily remain lodged in the lower middle part of the stump are (with the present invention) permitted to come loose from the stump. Thus, the stump sections become easier to move, and also if the stump sections are to be transported to other locations, they can be loaded more compactly for efficient transportation. Further, by removing the stumps in smaller sections, if these are to be burned they can be burned more quickly and effectively. Alternatively, if these are to be cut into chips or smaller wood pieces, with the greater removal of dirt and rocks, this can be done more effectively.

In the method of the present invention, the tree stump is initially in a ground embedded position, with the stump having an upper stump portion and a root system comprising roots extending from the upper stump portion into the surrounding ground strata.

There is first provided a stump splitting and dislodging assembly which comprises a stump splitting means having a leading edge and side splitting surface portions extending rearwardly from the leading edge. The stump splitting means is positioned and moved to cause the leading edge to engage the upper stump portion and to split the upper stump portion along at least one substantially vertical splitting plane.

There is also provided a stump dislodging means having an earth penetrating portion. The stump dislodging means is positioned and moved to penetrate into these ground stratas surrounding the stump and sever the roots and/or separate the roots from the surrounding ground strata and thus dislodge the stump from its ground embedded engagement in the earth strata. In the preferred form, the splitting means is positioned below the stump dislodging means, and fixedly connected thereto. The splitter means is thus moved through the upper stump portion in a splitting motion, with the dislodging means being positioned above the stump portion. Also, in the preferred form, there is provided an operating arm means, and the dislodging means and the splitting means are rotatably mounted to this arm means. The dislodging means and the splitting means are rotated between a splitting position where the splitting means has a substantial horizontal alignment component, and a dislodging position where the dislodging means is oriented to penetrate into the ground strata.

Also, in a preferred form, the dislodging means comprises bucket means having a lower wall means and containing side wall means defining with the lower wall means of containing area. The bucket means has earth digging edge means adjacent to the lower wall means, and the bucket is operatively connected to the operating arm means.

More specifically, the method comprises in one form providing backhoe means which in turn comprises the arm means and the bucket means, with the splitting means detachably mounted to the bucket means.

In a more preferred form of the present invention, there is further provided saw plate means operatively connected to an assembly comprising these splitting means and the dislodging means. A cutting edge of the saw plate means is position downwardly, and the saw plate means is moved through the upper stump portion in sawing engagement therewith. This forms a a kerf in the upper stump portion, and the splitting means is then moved through this kerf to split the upper stump portion.

In the apparatus of the present invention, the stump splitting means and the stump dislodging means are combined in an assembly where these are operatively interconnected with one another. Further, there are assembly operating means to operate both a stump splitting and dislodging assembly as described above. This assembly has a front end, a rear end, and a lengthwise axis. In the preferred form, the splitting means has a substantial alignment component parallel to the lengthwise axis, in an operative position substantially parallel to a horizontal axis.

The present invention further comprises the splitting means as an attachment which can be removably attached to an earth engaging member (more particularly in a preferred form the bucket of a backhoe or the like), with the stump splitting means further comprising an attaching means by which the stump splitting means is operatively attached to the bucket or other earth engaging member. Further, the splitting means comprises a splitting plate means which is mounted to be spaced below the bucket.

Also in the preferred form the attachment comprises the saw plate means which in the preferred form extends downwardly from the plate means.

Other features of the present invention will become apparent from the following detailed description.

BRIEF DESCRIPTION OF THE DRAWINGS

FIG. 26 is a side elevational view of the attachment of a second main embodiment of the present invention;

FIG. 27 is a bottom plan view of the attachment shown in FIG. 26;

DESCRIPTION OF THE PREFERRED EMBODIMENTS

Figure 1:
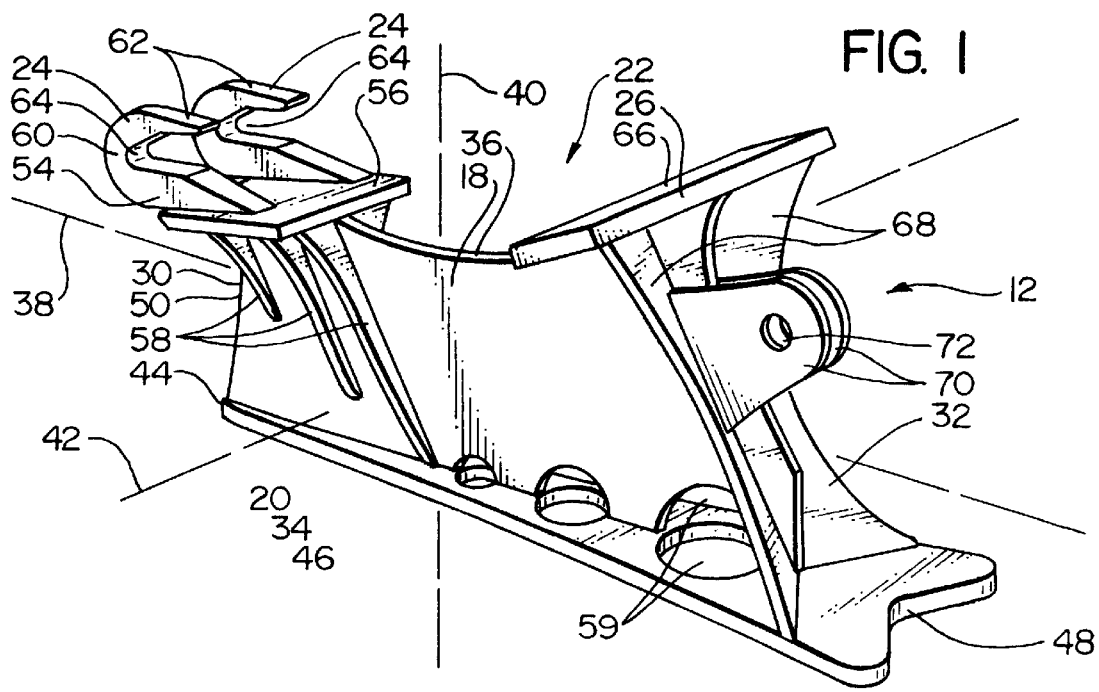
FIG. 1 is an isometric view showing the splitting attachment of the present invention.

The combination 10 of the first embodiment of the present invention comprises a splitting attachment 12, a trackhoe 14, and a bucket assembly 16 of the trackhoe 14, this bucket assembly 16 having a bucket 17.

The trackhoe 14 and the bucket assembly 16 of the trackhoe 14 are, or may be, of conventional design. The splitting attachment 12 is in the preferred embodiment configured so that it can be easily attached to, or removed from, the bucket of the bucket assembly. Further, as will be disclosed more fully later herein, the splitting attachment 12 is arranged and configured so that it can very effectively be operated from the bucket attachment to accomplish the appropriate splitting action of the tree stump, and yet be positioned so that the splitting attachment 12 will not interfere to any significant extent with the other operations of the bucket assembly in the stump removal operation. Specifically, the use of the splitting attachment 12 permits the substantially unimpeded action of the bucket assembly in rooting the stump sections out of the ground, shaking these to remove the dirt and rocks from the tree stump sections, and then depositing these in a collecting location, usually either for burning or moving to another site. Also the splitting attachment 12 can itself be used to cut the roots.

The splitting attachment 12 comprises a main plate 18, a splitting plate 20 attached to the bottom part of the plate 18, and an attachment means 22, which in turn comprises a pair of front hooks 24, a rear positioning plate 26 and a rear attachment arm 28.

The main plate 18 has a flat planar configuration and is vertically and longitudinally aligned. For purposes of description, the splitting attachment 12 shall be considered as having a forward end 30, a rear end 32, a lower part 34 and an upper part 36. Also, the attachment 12 will be considered as having a forward to rear longitudinal axis 38, a vertical axis 40, and a transverse axis 42 perpendicular to the longitudinal axis 38 and the vertical axis 40.

Figure 2A:
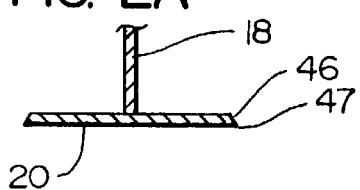
FIG. 2 is a side elevational view showing the splitting attachment of FIG. 1 mounted to the bucket of a trackhoe, positioned to engage the upper part of a tree stump.

The splitting plate 20 has a generally horizontal, planar configuration and is triangularly shaped. The leading edge 44 of the splitting plate 20 is sharpened to form a lower, vertically aligned splitting edge. The side edges 46 of the splitting plate 20 diverge from one another in a rearward direction at a relatively shallow angle with respect to one another, this angle being optimized to accomplish the proper splitting action. These side edges 46 have relatively blunt splitting surfaces which as shown herein are vertical flat surfaces. Also, as shown in FIG. 2A, the edge 46' of the splitting plate 20 can be slanted downwardly and outwardly to form an edge 47 that can cut into the stump for better gripping and further reduction of friction.

As shown herein, the rear end of the splitting plate 20 is notched at 48 in the event that the attachment 12 is used to accomplish a pushing motion or other operation by engaging the rear end of the plate 20 with some object. Also the rear edge of the splitter plate 20 could be made with sawteeth for engaging an object to be moved.

The forward edge 50 of the main plate 18 is made as a sharp splitting edge which is generally vertically aligned with the front edge 44 of the splitting plate 20 and a moderate concave curve and a moderate upward rearward slant. The plate leading edge 50 cooperates with the leading edge 44 of the splitting plate 20 to engage the side of the stump (indicated at 52 in FIG. 2) to begin the splitting action.

The two front mounting hooks 24 each have a lower base portion 54 which is welded or otherwise attached to an upper forward mounting plate 56, which is in turn fixedly attached to the upper front edge of the main plate 18. A plurality of bracing plates 58 are interconnected between the forward side portions of the main plate 18 and the mounting plate 56. There are through holes 59 formed at the bottom of the plate 18 and at the longitudinal center line of the plate 20 to permit dirt to flow through for self cleaning and avoid an accumulation of dirt on the attachment 12.

Each of the two hooks 24 have a forward curved portion 60, which extends upwardly and leads into a rearwardly extending gripping finger 62, each finger 62 forming a recess 64 which engages the front edge of the bucket bottom plate.

The aforementioned rear positioning plate 26 has an upwardly facing bucket engaging surface 66 and is connected to the upper rear edge portion of the main plate 18. There are also provided two rear bracing plates 68 which are rigidly connected to and extend between the positioning plate 26 and the rear upper surface portion of the splitting plate 20, with these bracing plates 68 also being attached fixedly to the rear side surface portions of the main plate 18.

Figure 2:
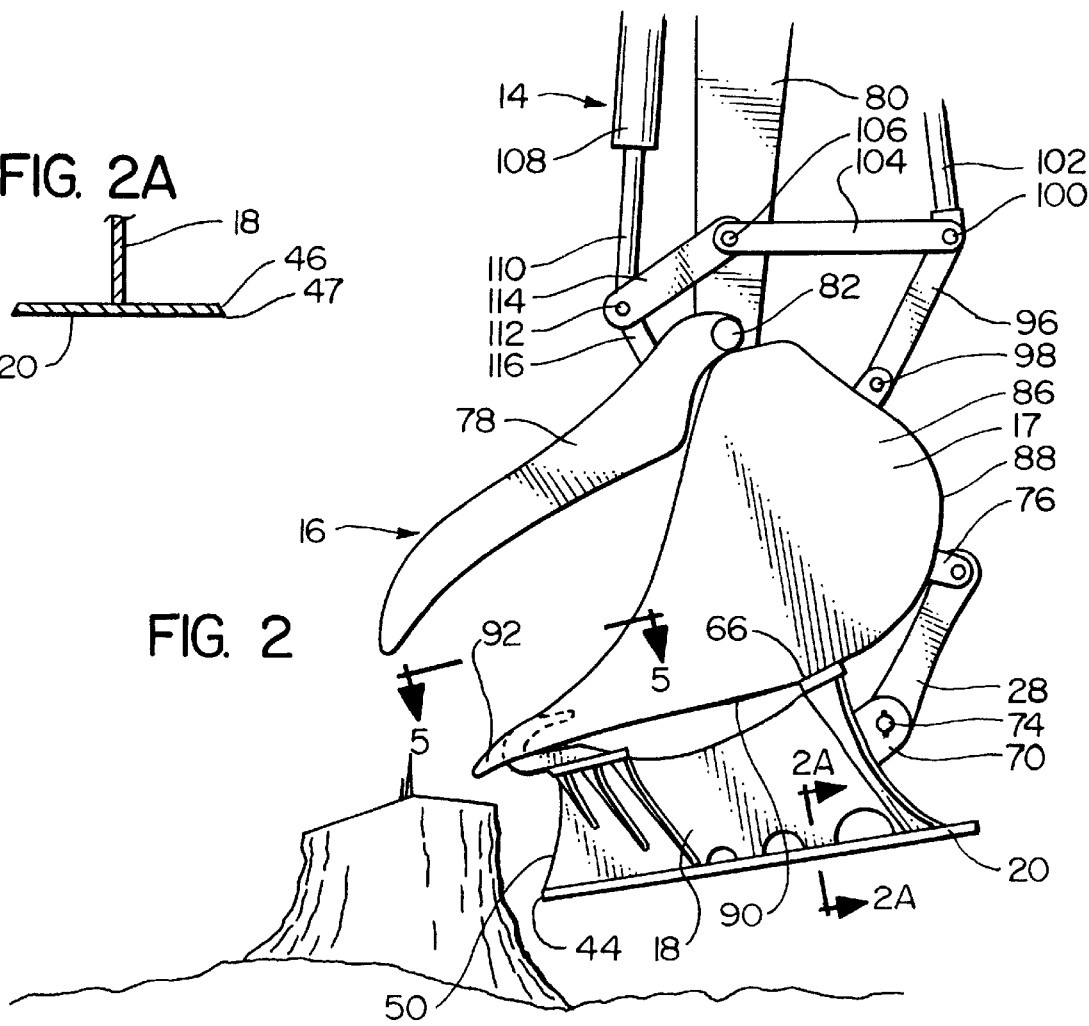

A pair of ears 70 are fixedly connected to the rear middle portion of the main plate 18 and also to the bracing plates 68, and these ears have aligned through openings 72 to enable these to be connected to the lower end of the aforementioned rear attachment arm 28, through a pin or bolt connection indicated at 74 (see FIG. 2). The arm 28 remains attached to the ears 72, and this can be made as a permanent pivot connection. The upper end of the arm 28 connects to a pair of ears 76 which are welded onto the back surface of the bucket 17 of the bucket assembly 16, also by a pin or bolt connection.

To turn our attention now to the bucket assembly 16. As indicated previously herein, the entire bucket assembly 16 and also the trackhoe 14 of themselves can be of conventional design. The only adaptation made in this present embodiment is to attach the ears 76 (e.g. by welding) to the backside of the bucket 17 of the bucket assembly 16. Accordingly, it is believed that it will be adequate to describe only those portions of the bucket assembly 16 and the trackhoe 14 which cooperate more closely in the combination 10 of the present invention.

Figure 5:
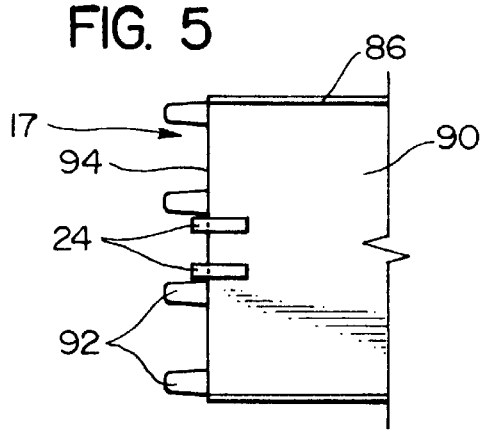
FIG. 5 is a plan view looking down on the front portion of the bottom plate of the bucket of the trackhoe, showing the mounting hooks of the attachment connecting to the middle front portion of the trackhoe bottom plate.
Figure 6:
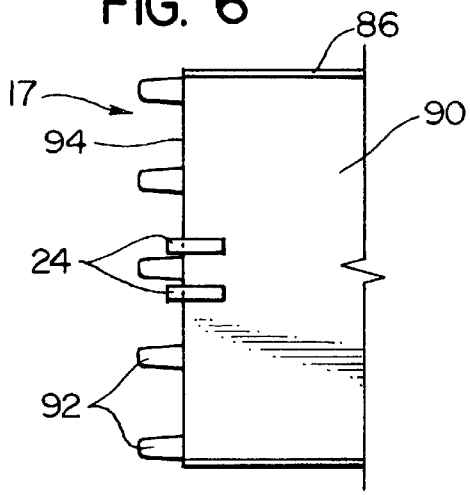
FIG. 6 is a view similar to FIG. 5, but showing the mounting hooks mounted to the bottom plate of the trackhoe where these straddle a middle tooth of the bucket of the trackhoe.

With reference to FIG. 2, the bucket assembly 16 comprises the aforementioned bucket 17, a thumb 78, and an operating arm 80 to which the bucket is pivotally connected at 82, and to which the thumb is pivotally connected also at 82. The bucket is of conventional design, has two side walls 86, a back wall 88, and a bottom wall 90. At the front end of the bottom wall 90, there is a plurality of teeth 92. The aforementioned ears 76 are welded or otherwise fixedly connected to the lower rear portion of the back wall 88. The aforementioned front mounting hooks 24 engage the front edge portion 94 of the bottom wall 90 of the bucket 17. In FIG. 5, the bucket 17 is shown as having four teeth 92, while in FIG. 6, there are five teeth 92.

The aforementioned rear positioning plate 26 fits against a lower rear surface portion of the bottom wall 90 to stabilize the splitting attachment 12 so that it can be rigidly held against the bucket 17. The arm 28, reaching between the ears 72 on the attachment 12 and the ears 76 connected to the bucket 17 hold the positioning plate 26 against the bottom wall 90 of the bucket 17.

The actuating mechanisms in the bucket assembly are, or may be, conventional. As shown herein, the upper rear portion of the bucket is connected by arms or an arm 96 reaching from the lower pivot connection 98 to connect pivotally at 100 to the rod 102 of a hydraulic piston. There is a positioning rod 104 connecting between the pivot location 100 and another pivot location 106 on the arm 80. It is evident that by retracting or extending the hydraulic actuating rod 102, the bucket 17 can be rotated about the pivot location 82.

To operate the thumb 78, there is provided an hydraulic actuator 108, having an actuating rod 110 that is pivotally connected at 112 to one end of a positioning rod 114, the other end of which is connected to the pivot location at 106. The thumb connects by means of an extension 116 to the pivot connection at 112.

To describe the operation of the present invention, let us assume that the trackhoe 14 is about to be used in an operation to clear the stumps 52 from a field. To attach the bucket 17 to the splitting assembly 12, the attachment 12 is simply positioned with its splitting plate 20 resting on a flat horizontal surface. The trackhoe 14 is operated so that the bucket is moved into a position where the front edge 94 of the bucket bottom plate 90 is positioned within the recesses 64 of the hooks 24, and so that the rear part of the bucket bottom plate 90 rests against the positioning plate of the attachment 12. The connecting arm 28 is generally already connected between the ears 72 on the back of the attachment 12. The upper end of the arm 28 is then connected to the ears 76 at the back end of the bucket 17. In this manner, the splitting attachment 12 is fixedly attached to the bucket 17.

Figure 3:
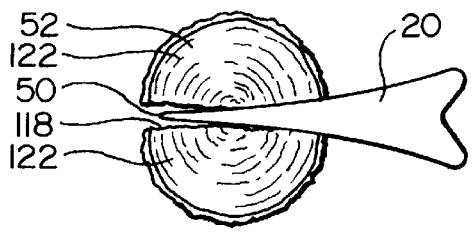
FIG. 3 is a top plan view showing only the splitting plate of the splitting attachment engaging the upper part of the tree stump to split the same.
Figure 4:
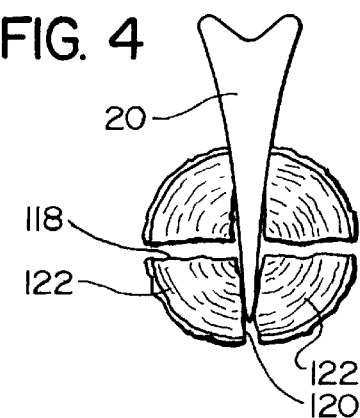
FIG. 4 is a plan view similar to FIG. 3, showing the splitting plate again splitting the top part of the stump along a splitting plane perpendicular to the splitting plane of FIG. 3.

In the stump clearing operation, the trackhoe 14 is positioned a short distance away from the stump 52 so that the bucket 17 can be positioned on one side of the stump 52 and a short distance above the stump 52. In this position, the front knife edges 44 and 50 are at the same level as the upper part of the stump 52. Then the arm 50 is moved forwardly by the trackhoe 14 so that the edges 44 and 50 cut into the stump 52 and start the splitting action along a splitting plane 118. This is illustrated in FIG. 3. If desired, the trackhoe 14 can be repositioned to initiate a second cut along a splitting plane 120 at right angles of the splitting plane 118.

Figure 7:
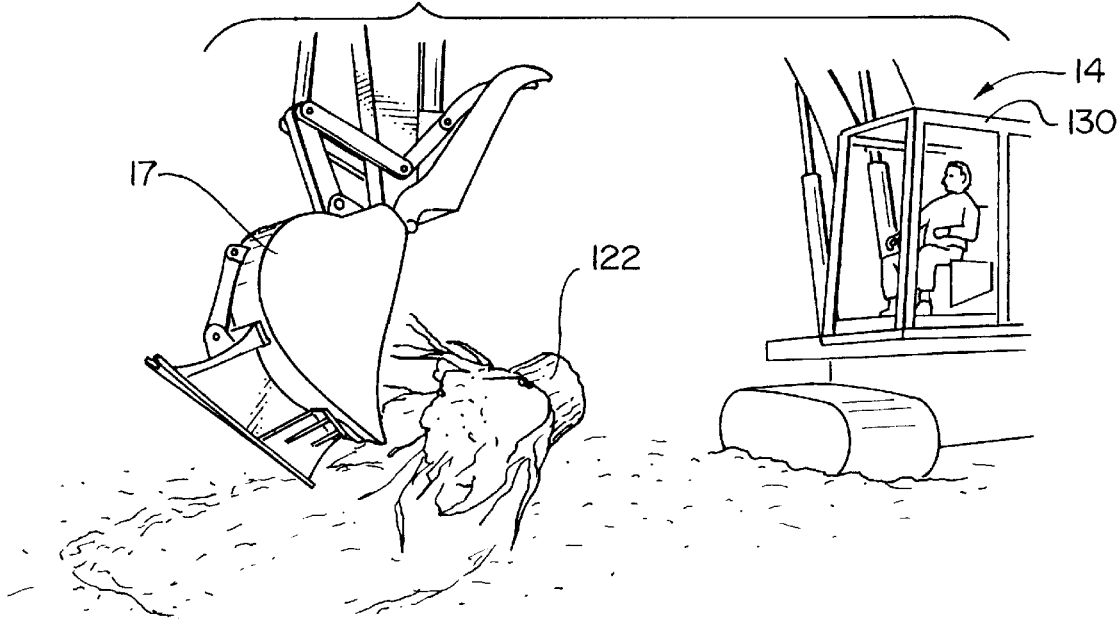
FIG. 7 is a perspective view showing the attachment of the present invention mounted to a trackhoe where the trackhoe with the attachment is in the process of pulling a stump section out of the ground.

With the upper part of the stump 52 being split into two or more separate sections, the bucket 17 is manipulated so that it digs into the ground and into the roots extending from the stump sections (designated 122) to move these out of the ground. It has been found in actual field operation utilizing the present invention that the task of removing the separate stump sections 122 can be accomplished much more quickly than if the trackhoe is used by itself. Also, it has been found that the presence of the attachment 12 remaining attached to the bucket 17 permits the bucket 17 to operate in its usual fashion where it is rotated rearwardly about the pivot 82, dug into the ground and then rotated and moved into the roots or under the roots to engage the bottom part of the stump. In FIG. 7, the bucket 17 is shown lifting one of the stump sections 122 out of the ground and rolling it.

After the stump section 122 has been moved out of the ground (or both or all of the stump sections 122 of that stump 52 have been moved out of the ground), it is often desirable to remove, as much as possible, the dirt and rocks that remains around and between the roots of the stump. This is often accomplished by rolling the stump, shaking it, jarring it by impacts with the bucket, or other maneuvers. It has been found that by cutting the stump 52 into the sections, this rock and dirt removal operation can be greatly facilitated and also accomplished more completely.

Figure 8:
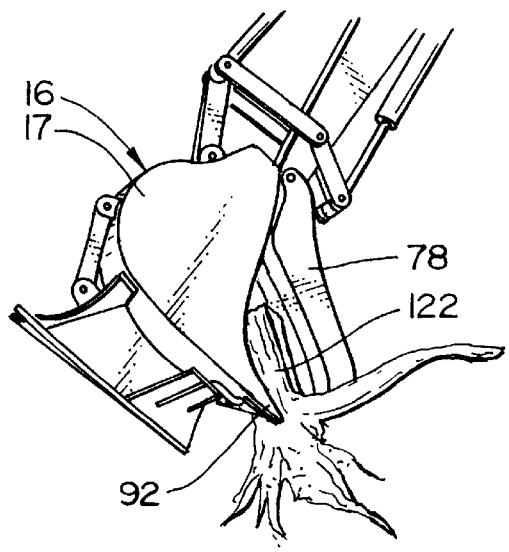
FIG. 8 is a perspective view similar to FIG. 7, showing a bucket assembly lifting and shaking the tree stump to remove rocks and dirt from the roots.

In FIG. 8, the bucket assembly 16 is shown with the front teeth 92 of the bucket 17 engaging the stump section 122, and the thumb 78 having been moved downwardly to grip the stump section 122.

When the stump clearing operation has been completed, and the trackhoe is to be used for other purposes, the removal of the splitting attachment 12 can easily be accomplished simply by positioning the splitting attachment 12 onto a flat surface. It is then necessary only to remove the pin connection of the upper ends of the arm 28, and the bucket 17 can then be moved free of the splitting attachment 12.

In FIG. 7, the trackhoe 14 is shown where the body 130 of the trackhoe is mounted on tracks. One effective way of utilizing the present invention is to position the body 130 of the trackhoe at a central location in the middle of a number of stumps, and then rotating the trackhoe body 130 different angular positions to dislodge each of the stumps 52 within its reach. Also, a backhoe could be used in the present invention.

It is to be recognized that various modifications can be made to the present invention without departing from the basic teachings thereof. For example, in some instances where the apparatus of the present invention is to be used for extended periods of stump removal (or to be used solely for stump removal), the splitting attachment could be made a permanent attachment to the bucket 17. Also, the bucket assembly 17 could take different configurations within a broader scope of the present invention. For example, if the trackhoe 14, instead of having a conventional bucket 17, has a rake attachment where there are elongate teeth, the present invention could be used in connection with a somewhat modified attaching means.

It has been found that in the particular combination shown in this preferred embodiment, the stump removing process has been found to be particularly effective. While precise comparisons have not been made in the time reduction accomplished by the present invention, it has been found that the time within which a given field can have the stumps removed therefrom has been reduced significantly. It is believed that one of the significant factors in contributing to the very effective operation of the present invention is that the splitting attachment 12 can be positioned and utilized in such a manner that it functions very effectively in combination with the existing mechanisms of the trackhoe 14 and the bucket assembly 16 to accomplish the splitting motion. Then after the splitting has been accomplished, the very same bucket assembly 16 can be used in its conventional manner to accomplish the stump removal operation. With the stump being split into sections, the holding power of the roots with the ground for the separate sections has been greatly reduced, and the two stump sections 122 can be removed in much less time than it would take to remove the entire stump 52 if it had not been split into sections.

In the following text there are presented various modifications that could be utilized in the present invention.

Figure 9:
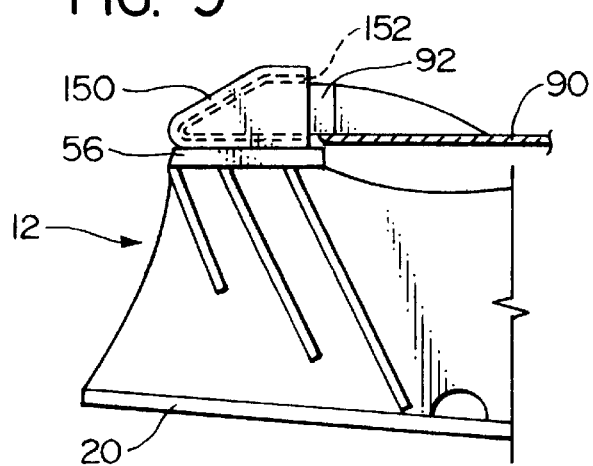
FIG. 9 is a longitudinal sectional view showing a modified form of a front connection for the splitting attachment.

In FIG. 9, there is shown another means for connecting the forward end of the splitting attachment 12 to the bucket 17. Instead of using the hooks 24, there is provided a pair of boots 150 which are welded to the plate 56. Each boot defines a rearwardly facing opening or recess 152 which has generally the same configuration as the teeth 92. Two of the teeth 92 are moved into engagement with the two boots 150 to connect the forward end of the attachment 12 to the bucket 17.

Figure 10:
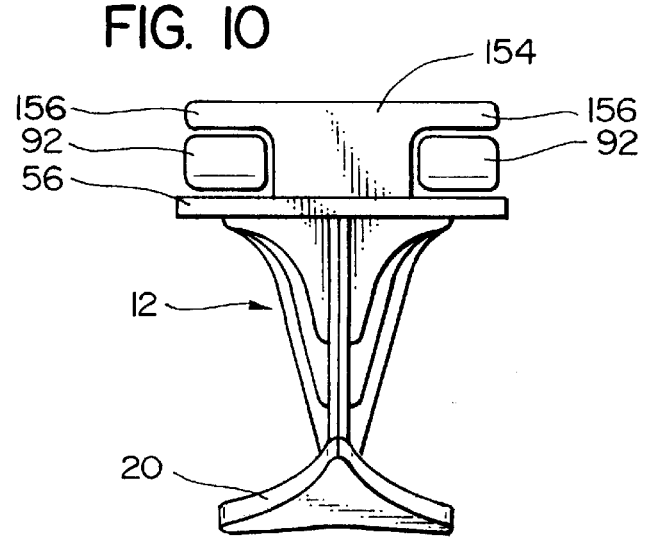
FIG. 10 is a front elevational view of another type of front end connection.

FIG. 10 shows yet another means of connecting the forward end of the splitting attachment 12 to the bucket 17. This particular attachment is defined as a "T hanger", designated 154. This is welded to the upper plate 56, and it has two arms 156 which extend laterally to reach over the two adjacent teeth 92.

Figure 11:
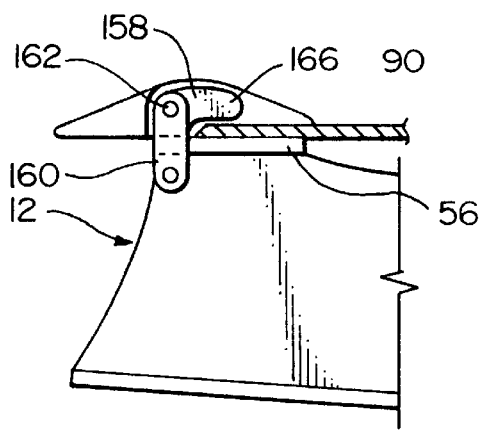
FIG. 11 is a longitudinal sectional view showing yet another form of a front end connection.

FIG. 11 shows yet another means of attaching the front of the attachment 12 to the bucket 17. There is a pair of right angle bell cranks 158, each of which is pivotally mounted to a related pair of ears 160 that are connected to the bottom front edge of the aforementioned plate 56. Each bell crank 158 can be swung up so that it is in the position as shown in FIG. 11. Then a pin or other connector 162 can be inserted through related ears and also through the bell crank 158 to hold it in place. The rearwardly extending retaining finger 166 of each bell crank 158 holds the front end of the attachment in place.

Figure 12:
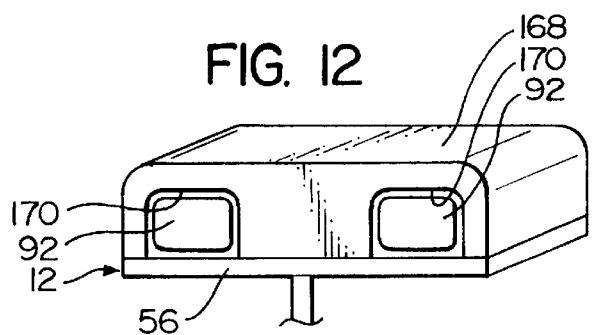
FIG. 12 is a isometric view showing another front connection somewhat similar to that shown in FIG. 10.

FIG. 12 shows yet another means of attaching the forward end of the splitting attachment 12 to the front end of the bucket 17. This is similar to the connecting device shown in FIG. 10, and in FIG. 12 there is shown a connector 168 that is welded to the top of the plate 56. The member 168 has two through openings 170, each of which engages a related tooth 92.

Figure 13:
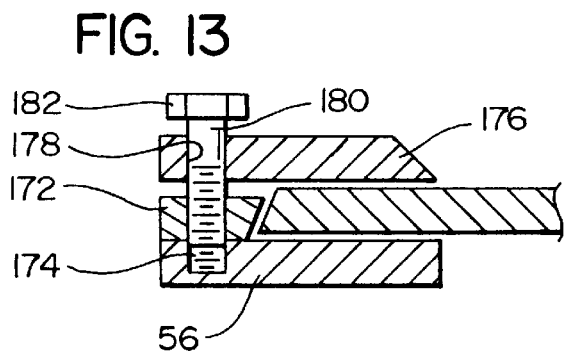
FIG. 13 is a longitudinal sectional view showing yet another front end connection for the splitting attachment.

Another front end connecting device for the attachment 12 is shown in FIG. 13. The plate 56 has at its front end a member 172 fixedly connected thereto. This member 172 and the upper forward portion of the plate 56 have a threaded opening 174. To accomplish the connection, there is provided a gripping finger 176 which has a forward through opening 178. A connecting bolt 180 is inserted downwardly through the opening 178 and into the threaded opening 174. The head 182 of the bolt 180 grips the upper surface of the finger 176 so that it can be pressed into firm engagement with the forward portion of the lower bucket wall 90.

Figure 14:
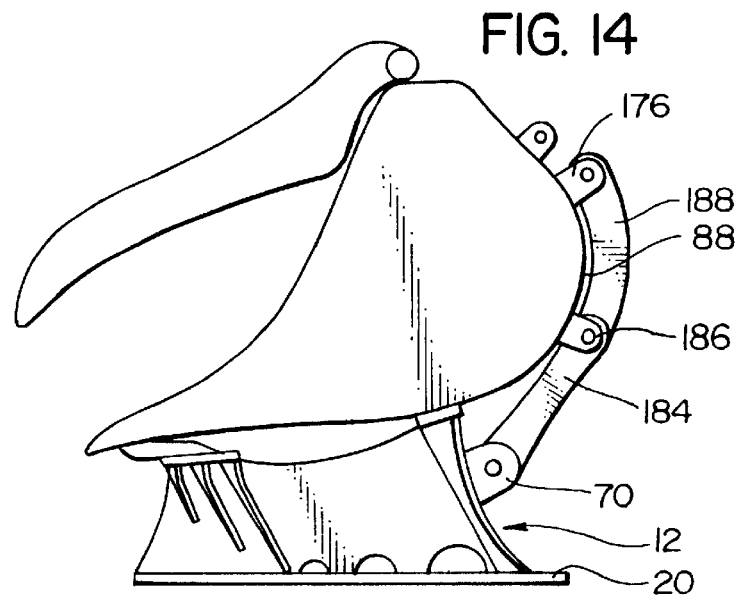
FIG. 14 is a side elevational view showing a modified form of the rear connecting arm.

FIG. 14 shows another configuration of the aforementioned connecting arm 28. In this instance, the pair of rear ears 70 pivotally connect to a first lower link 184 which is in turn pivotally connected at 186 to an upper link 188, which in turn connects to upper ears 176. Thus, the two links 184 and 188 can conform to the rear surface 88 of the bucket 17.

Figure 15:
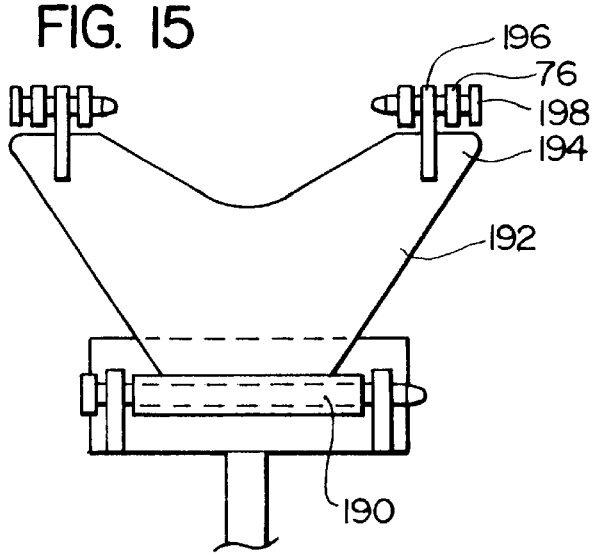
FIG. 15 is a rear elevational view showing an attaching plate to connect the rear end of the splitting attachment to the bucket.

FIG. 15 is a rear elevational view showing another embodiment which is a rear attachment device that can be substituted for the aforementioned attachment arm on 28. In this arrangement, there is provided a hinge connection 190 to mount a plate 192 which has at its upper side edges 194 a related tab 196 that has a through opening to receive a pin 198. The pin connects to the ears 76.

The widely spaced mounting tabs 196, along with the hinge connection 190, and with the single integral plate 192, provides greater stability for the rear end connection of the splitting attachment 12. Also, this would provide greater stability for side loads imparted to the attachment 12.

Figure 16A:
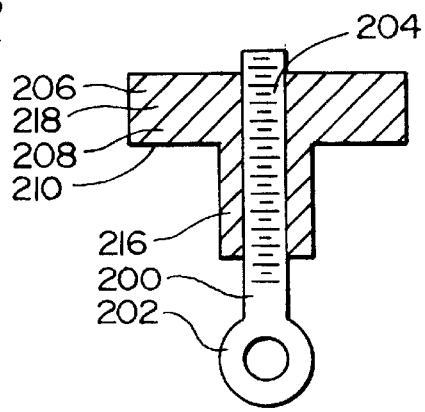
FIG. 16A is a view partly in section, showing one component of a rear attaching device.
Figure 16B:
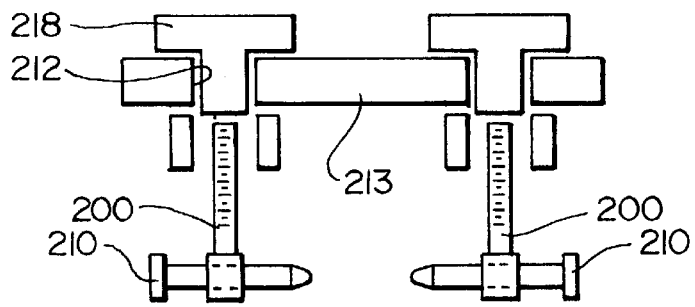
FIG. 16B is a rear elevational view showing the total attaching device in which the apparatus of FIG. 16A is used.
Figure 16C:
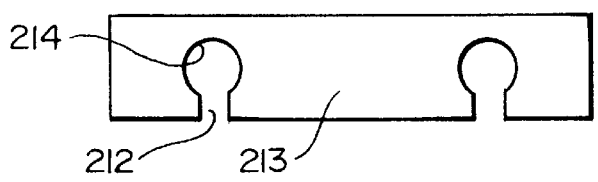
FIG. 16C is a top plan view of the attachment plate for the device shown in FIG. 16B.

FIGS. 16A, 16B, and 16C show another means of connecting the rear part of the attachment 12 to the bucket 17. To accomplish this, there is provided a pair of connecting arms 200 each having a lower end 202 that is able to pivotally connect to ears at the rear end of the attachment 12. The upper end 204 of each arm is threaded, and it engages a related nut 206 that has a laterally extending perimeter flange 208 that has a downwardly facing gripping surface 210. With reference to FIG. 16B, which is a rear elevational view, each of the arms 200 are shown pivotally connected each to lower pin 210. Each arm 200 can be swung upwardly to fit into a related slot 212 of the plate 213 which leads into a circular recess 214, having a diameter moderately greater than the width dimension of the slot 212, this also being formed in the plate 213. For convenience of illustration, the slot 212 is not shown in its true lateral dimension, as it is in FIG. 16C. When the arm 200 is aligned with its related upper circular recess 214, then the nut 206 is threaded downwardly onto the threaded end 204. The lower portion 216 of the nut 208 fit within the circular opening 214. This nut portion 216 has a diameter greater than the width dimension of the slot 212, and thus is retained within the circular opening 214. The lower bearing surface 210 of the upper nut portion 218 bear downwardly against the mounting plate 211. Alternatively, the plate 211 can be made with a single slot 212 and opening 214 to receive only a single connecting arm 200.

Figure 17:
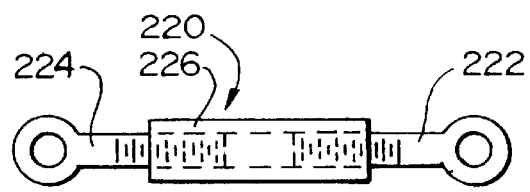
FIG. 17 is a modified form of the rear connecting device, shown as a turnbuckle.

FIG. 17 shows another means for attaching the rear end of the splitting attachment 12 to the bucket 17. In this instance, the attachment arm 28 is replaced with a turn buckle 220, having two end connecting members 222 and 224, respectively. these connecting members 222 and 224 have opposite threads, and these are threaded into a middle connecting member 226 which can be rotated to shorten or lengthen the turn buckle 220. This enables the slack to be taken out of this rear mounting.

Figure 18:
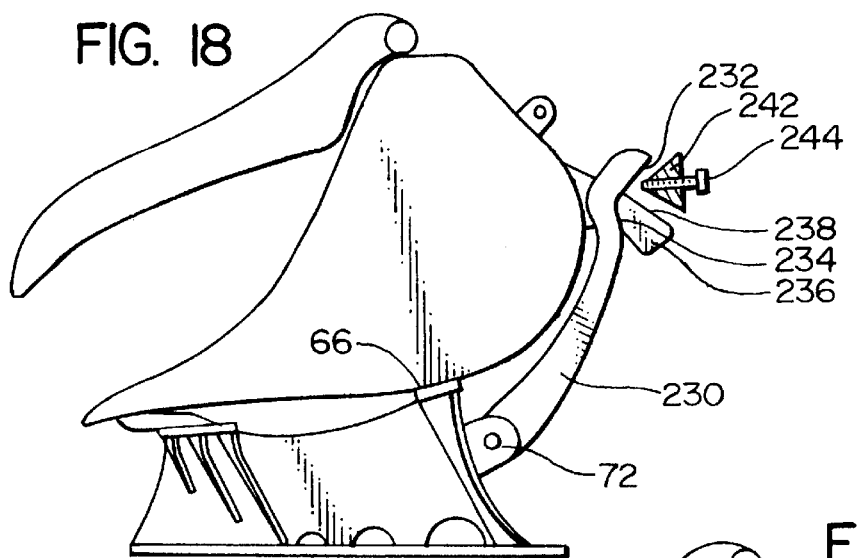
FIG. 18 is a side elevational view, partly in section, showing yet another rear connecting device.

Another connecting means for the rear of the attachment 12 is shown in FIG. 18. There is provided a connecting arm 230 pivotally mounted at its lower end to the ears 72. The upper end of the arm 230 has a recess formed by a pair of slanting surfaces 232 and 234. The upper end of the arm 230 passes between a pair of ears, one of which is shown at 236. Each ear 236 has a slanting surface 238 that slants downwardly and rearwardly. The upper rearwardly facing slanted surface 232 of the arm 230 forms an angle with the aforementioned surface 238. There is a wedge member 242 which extends across both of the ears 236, and also has a center portion facing the aforementioned surface 240.

At opposite ends of the wedge member 242, there are openings, each to receive a related bolt 244. Each of the bolts 234 is inserted through a related end opening of the wedge 242 and threaded into the bucket or into an attaching plate welded to the back end of the bucket.

The method of making the connection is as follows. The arm 230 is swung up to be positioned between the two ears 232. Then the wedging member 242 us placed against the aforementioned slanted surfaces 238 and 232. The two bolts 244 are then inserted through the related openings in the wedge 242 and tightened down to press the wedge 244 against the surfaces 238 and 232. The wedging action that results from this not only pushes the upper end of the arm 230 securely against the bucket 17, but imparts a lifting force so that the bucket 17 is pressed downwardly as it goes to the plate 66.

Figure 19:
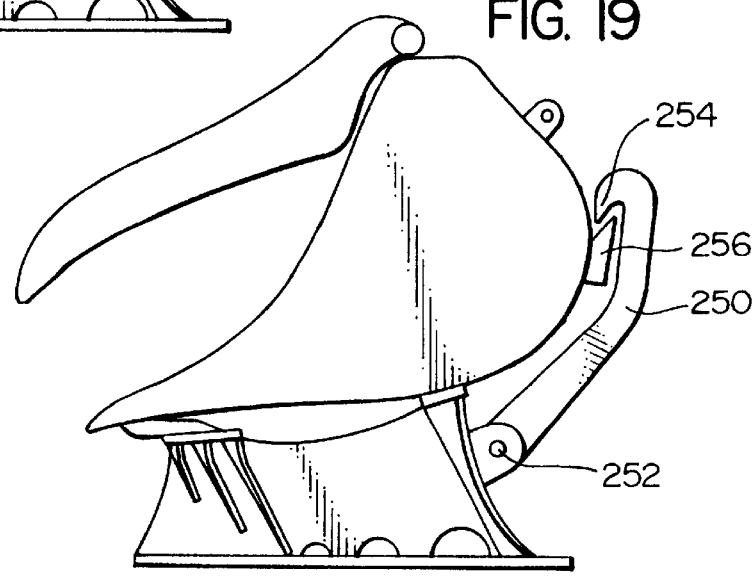
FIG. 19 is a view similar to FIG. 18 showing a modified form of a rear connecting arm.

FIG. 19 shows a modified version of the rear attachment arm 28. In this instance, there is an arm 250 pivoted at 252 and having an end hook 254 which comes into engagement with the upwardly and rearwardly slanting face of a wedge plate 256 welded to the back of the bucket 17. This type of attachment as shown in FIG. 19 can be used in connection with another device mounted to the rear end of the attachment 12 so as to press from the splitting attachment 12 upwardly against the lower rear end of the bucket 17. Three such devices are shown in FIG. 20, 21, and 22, respectively.

Figure 20:
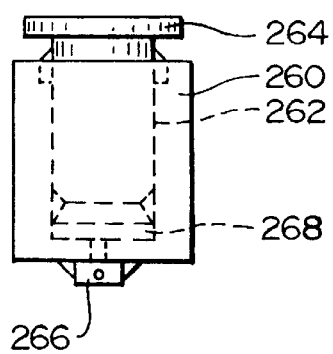
FIG. 20 is an elevational view showing a tightening device to press from the splitting attachment to the bucket to take out slack.

In FIG. 20, there is shown a cylinder block 260 in which there is mounted a piston-like member 262 that in turn has a jacking pad 264 at the upper end. At the lower end of the cylinder block 260 there is a grease fitting 266 to receive grease at a very high pressure. The grease flows into a chamber 268 beneath the piston member 262 to raise the pad 264 into firm engagement with the lower rear end of the bucket 17. When used in conjunction with the arm 250 shown in FIG. 19, this accomplishes the firm engagement of the hook portion 254 with the wedge plate 256.

Also, the arrangement shown in FIG. 20 could be used with a number of the other attaching devices, such as the connecting arm 28 shown in the first embodiment of FIG. 2, and also other various connecting devices shown herein.

Figure 21:
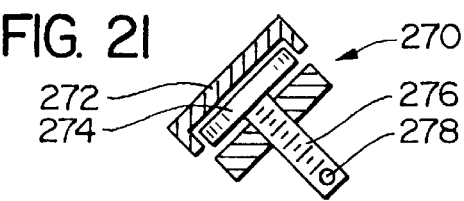
FIG. 21 is a view partly in section, showing a modified version of the type of device shown in FIG. 20.
Figure 22:
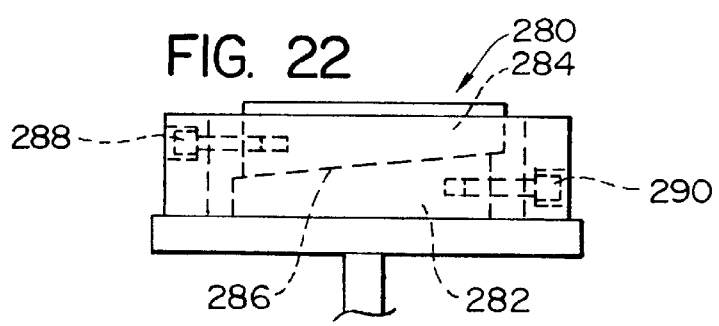
FIG. 22 is device serving a function similar to those in FIGS. 20 and 21, showing a wedging attachment for taking up the slack.

FIG. 21 shows another adjustable positioning member, which in FIG. 21 is shown as a jacking screw 270. There is a pair of these jacking screws 270 mounted on opposite sides of the positioning plate 26. There is a contact pad 272 which fits over a head 274 that is in turn connected to a threaded member 276. The threaded portion 276 has an end opening 278 to receive a bar, screw driver, or other device which can be inserted into the opening 278 and rotated to cause the threaded portion 276 to move the head 274 upwardly and thus raise the pad into its contact position. In this manner, the slack is taken out of the connection of the attachment to the bucket 17.

A further embodiment is shown in FIG. 22 where there is shown a wedging device 280 which comprises first and second wedge members 282 and 284, respectively, these engaging each other along a slanted interface at 286. There are a pair of actuating screws, one at 288 and the other at 290. These screws 288 or 290 can be rotated to move the wedge members 282 and 284 relative to one another to raise the contact surface 290 of the upper wedge member 284, thus taking the slack out of the connection of the splitting attachment 12 to the bucket 17.

Figure 23:
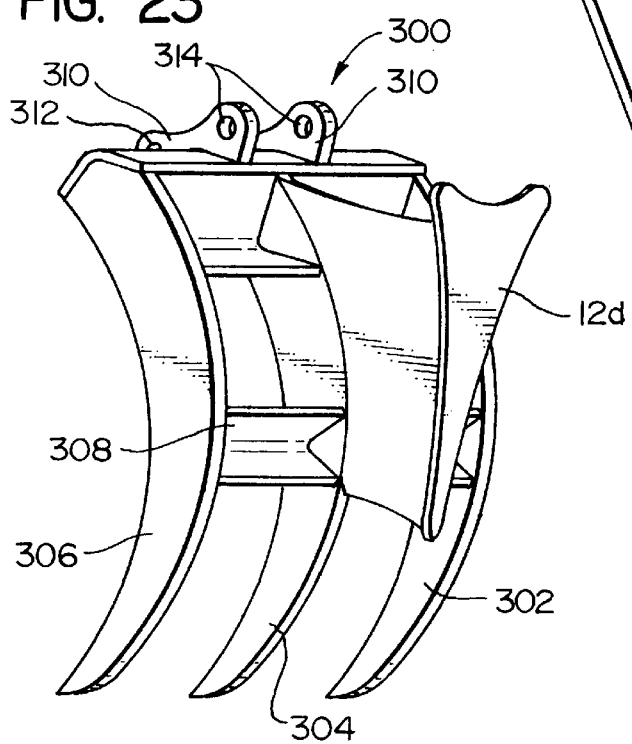
FIG. 23 is an isometric view showing the splitting attachment of the present invention mounted to a back rake.

FIG. 23 is a view illustrating somewhat schematically how the splitting attachment 12d of the present invention can be mounted to a clearing rake 300. This rake 300 in this particular version has three laterally spaced teeth 302, 304 and 306. This particular drawing was intended to be an isometric drawing and is somewhat out of proportion. It is to be understood that the three teeth 302, 304 and 306 should all be the same configuration and the same size. These teeth 302, 304 and 306 are interconnected by one or more cross-bracing members 308. Also, the rake has a pair of mounting brackets 310, these brackets 310 having two pair of aligned openings 312 and 314. The boom of the trackhoe mounts to the pair of openings 312. The opening 314 connect to the linkage that in turn connects to an actuator by which the rake 300 is tilted. The splitting attachment 12 is attached to the middle tooth 304. The means of attachment is shown somewhat schematically, and it is to be understood that any one of the prior attachment methods could be utilized to connect the attachment 12 to the rake 300.

Also, it is to be understood that this rake 300, (as well as the bucket 17) could within the broader scope of the present invention have most any sort of attaching means to connect to the splitting attachment 12, provided these provide sufficient strength. As indicated previously, for some applications, it may be desired to permanently attach the splitting attachment 12d, such as by welding, or to use other connecting means such as bolting it, etc.

It is to be recognized that in the broader sense, this rake attachment 300 functions in a similar manner to the backhoe assembly 16. The three teeth 302, 304, and 306 function in somewhat the same manner as the bucket, except that the dirt and rocks are not retained within the bucket, but fall between the teeth. The teeth 302–306 are designed to carry with them bulky objects that would not fall between the teeth.

It is believed that the manner of using the rake/splitting attachment combination shown in FIG. 23 is evident from the prior description given with regard to the manner of using the splitting attachment 12 in combination with the bucket assembly 16 and the trackhoe 14, so this will not be described in any detail herein.

Figure 24:
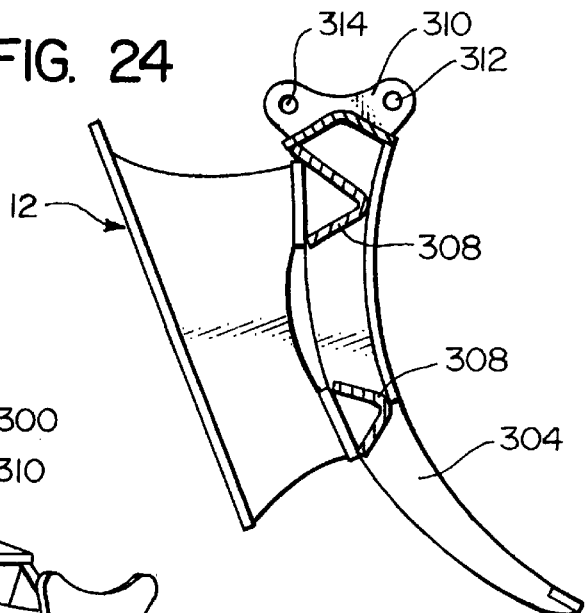
FIG. 24 is a side elevational view of the apparatus of FIG. 23.

FIG. 24 is a side elevational view of the rake and splitter attachment as shown in 23.

Figure 25:
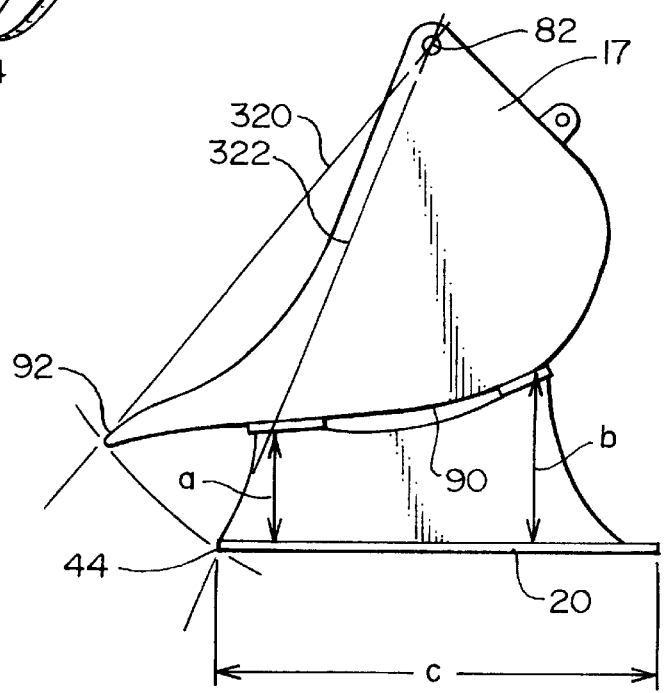
FIG. 25 is a somewhat schematic view illustrating the splitting attachment mounted to the bucket and giving relative dimensions and positioning of the members.

To illustrate some other considerations of the present invention, reference is now made to FIG. 25 which shows the bucket 17, the teeth 92, the bucket pivot location at 82 and the splitter plate 20.

The forward part of the bucket lower wall 90 is spaced a distance "a" from the top of the splitter plate 20, and the rear part of the splitter plate is spaced a distance "b" below the lower rear end of the bottom wall 90. The present analysis indicates that it is advantageous to have the dimension at "a" somewhat smaller than the dimension at "b". For a splitter plate 20 having a total length dimension of about 72 inches (indicated at "c" in FIG. 25), the dimension at "a" would be about 24 inches, while the dimension at "b" would be about 28 inches. This would alleviate the potential problem of the rear bottom portion of the wall 98 of the bucket 17 coming into unwanted contact with the top of the stump. Also, the forward end of the teeth 92 should be positioned forwardly of the leading edge 44 of the splitter plate 20.

It has been found suitable if a radius line 320 is drawn from the pivot location 82 to the front of the teeth 92 is approximately the same as the radius line 322 drawn from the pivot location 82 to the leading edge 44 of the splitter plate 20. It has been found that the position of the splitter plate leading edge 44 could be moved forwardly or rearwardly from this location, however. Normally, however, the position of the leading edge 44 of the splitting plate 20 would be rearwardly of the leading edge of the teeth 92. Another design consideration is that if there is a center tooth 92 that is aligned with the leading edge 44, that center tooth 92 would actually clear a way for the leading edge 44 in a digging operation. This is also a consideration in the placement of leading edge 44.

A second main embodiment of the present invention is shown in FIGS. 26 through 33. Components of the second embodiment which are similar to components of the first embodiment and its variations will be given like numerical designations, with an "a" suffix distinguishing those of this second main embodiment.

As in the first embodiment, this second embodiment comprises a splitting attachment 12a comprising a main plate 18a, a splitting plate 20a, and an attachment means 22a comprising front hooks 24a and a rear positioning plate 26a. In addition to these above components, this second embodiment comprises a saw plate 350 which extends vertically downwardly from the longitudinal center line of the splitting plate 20a. As will be described more fully hereinafter, this saw plate 350 is used to cut a kerf in the top of the stump to relieve grain tension and increase splitting leverage, after which the splitting of the stump is accomplished.

To continue with a more detailed description of the attachment 12a, as in the first embodiment, there is a forward mounting plate 56a braced by the plates 58a. In like manner, the rear positioning plate 26a is braced by the rear plate 68a. The splitting plate 20a has a forward leading edge 44a, side edges 46a, and a rear notch 48a which is configured somewhat differently from the notch 48 of the first embodiment. Also, instead of having a pair of attaching ears 70 as in the first embodiment, in the second embodiment there is a single attaching member 70a having a lateral through attaching opening 72a.

The saw plate 350 comprises a main plate portion 352 having an upper edge 354 welded to the lower surface 356 of the splitting plate 20a. The main plate 352 has a generally triangular configuration, with a front apex portion 358 being positioned a short distance behind the front splitting edge 44a. The vertical dimension of the main plate 352 increases in a rearward direction and terminates at the location of the rear notch 48a.

At the rear end of the main plate 352 the rear edge surface 360 is formed with a plurality of teeth 362. These are contoured in a manner to form an upper concave recessed portion 364, and a lower convexly curved tooth surface portion 366. Thus, this rear edge 360 has somewhat of a "S" shaped contour. As can be seen in FIG. 26, this saw tooth rear edge enables the saw plate 350 to engage a log 368 or other object that lies horizontally.

As previously mentioned, the rear edge of the splitter plate 20a has a somewhat modified notch 48a, shown in FIG. 27. This also is formed with a plurality of teeth 370 and these are formed in a concave curve to be able to engage a log 372 or other member which is vertically positioned or possibly positioned with a somewhat vertical slant, such as a limb or a log which is a partial "fall down". The concave rear edge 48a and the vertical rear edge 360 together make what is functionally an additional which can be described as a "serrated tri-point" for reverse motion stump removal.

At the lower edge of the saw plate 350 there are formed a plurality of saw teeth 374. The main plate 352 is formed with a plurality of tooth stubs 376, and each of these stubs 376 is capped by a replaceable saw tooth member 378, which will be described more completely hereinafter. It can be seen that each of the stubs 376 is separated from the adjacent stub by a U shaped recess 380.

It will also be noted that the front edge 382 of the main plate 18a of the splitter has a sharp edge which is formed in a concave curve (as seen in side elevation) so that it is better able to engage a log 384 or other object that is horizontally aligned. Also, this edge 382 acts as a knife to cut through brush, limbs, etc.

Figure 28:
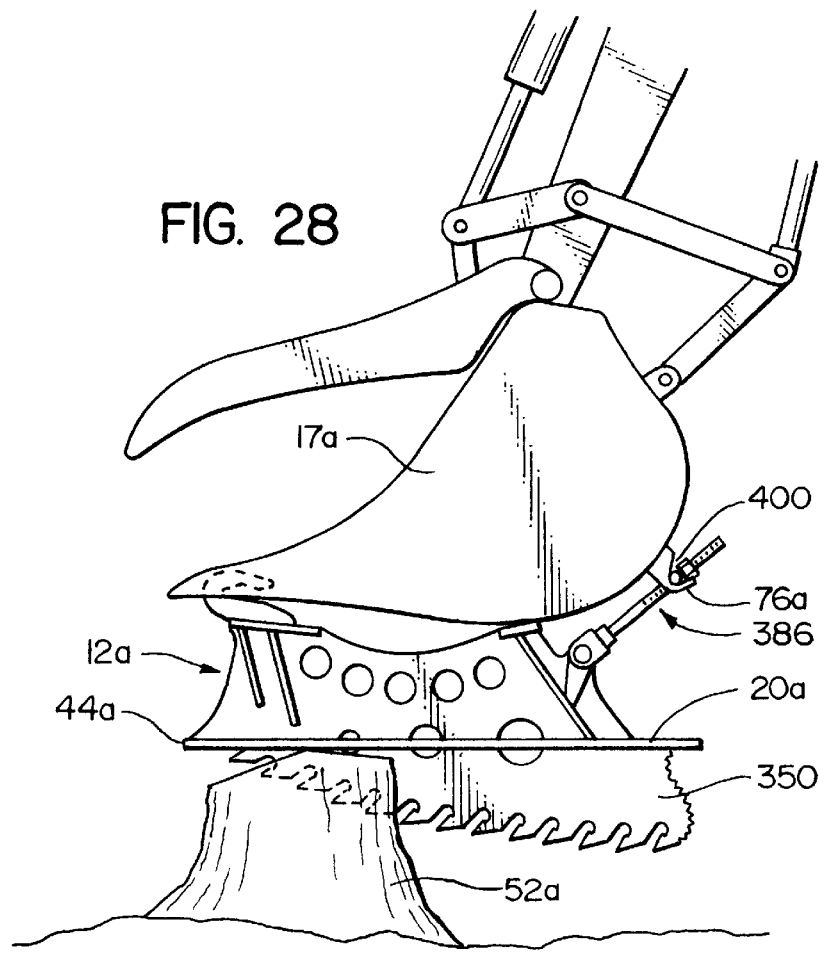
FIG. 28 is a side elevational view showing the attachment of the second embodiment mounted to a bucket of a trackhoe, with the saw plate cutting through a stump.
Figure 30:
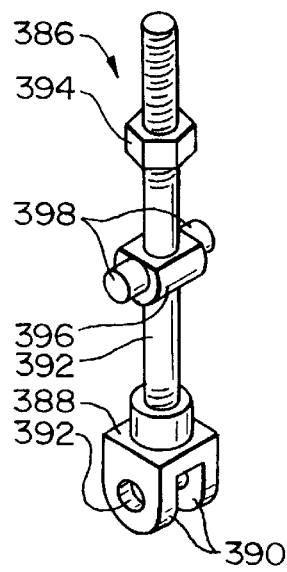
FIG. 30 is an isometric view showing a connecting device of the second embodiment.
Figure 29:
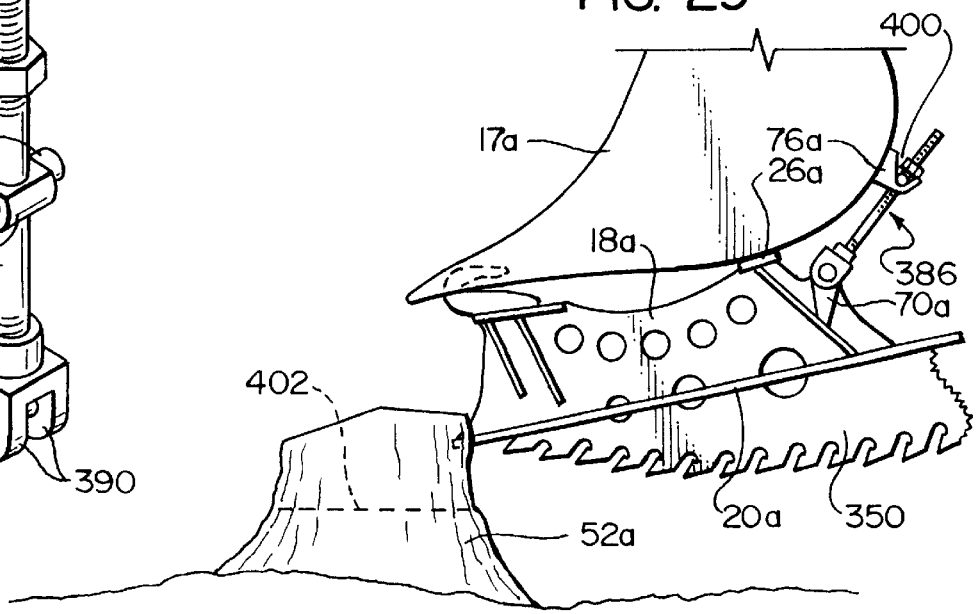
FIG. 29 is a view similar to view 28, but showing the kerf having been cut through the stump by means of the saw plate, and with the splitting plate entering the kerf that has been cut to split the stump.

Another new feature in this second embodiment is the manner of attaching the rear portion of the splitting attachment 12a to the bucket 17a of the backhoe or trackhoe. As can be seen in FIGS. 28–30, instead of having an attaching arm 28 as in the first embodiment, there is provided an attachment member 386. This member 386 comprises a lower clevis 388 comprising a pair of ears 390 with aligned through openings 392. Threaded into the upper end of the clevis 388 is a threaded shank 392 having thereon a retaining nut 394. Between the nut 394 and the clevis 388 there is a middle trunion like attaching member 396 having a pair of opposed side protrusions 398 which fit into upwardly extending slots 400 formed in the ears 76a that are welded to the rear of the bucket 17a. The trunion like attachment member 398 has a through opening so it can be slide upwardly or downwardly along the shank 392.

This attachment member 386 is initially attached between the bucket 17a and the attaching member 70a by moving the trunion like member 396 downwardly into the notches 400 so that the protruding members 398 fit within the notches 400. The clevis member 390 is positioned in engagement with the attaching member 70a so that the openings 392 are aligned with the opening 72a, and a pin is extended through the openings 392 of the clevis 388 and the attachment member 70a. Then the nut 394 is threaded downwardly until it firmly engages the upper surface of the trunion like member 396 and presses it downwardly into the notches 400. This pulls the rear positioning plate 28a snugly against the bottom surface of the bucket 17a.

The overall method of connecting the attachment 12a to the bucket 17a is generally the same as in the first embodiment, in that the teeth 24a are initially inserted over the front edge of the lower plate of the bucket 17a, after which the attachment member 386 is connected between the rear end of the attachment 12a and the bucket 17a.

To describe the method of the present invention, reference is made to FIGS. 28 and 29, After the splitting attachment 12a is mounted to the bucket 17a, the trackhoe, backhoe, track loader, or other machine to which the attachment 12a is attached is placed in position so that the attachment 12a can be positioned above the stump 52a. Initially, the front edge of the splitting attachment 12a has its front end spaced from the stump 52a so that it is facing the stump 52a, and the splitting plate 20a is located just above the top surface of the stump 52a. Then the bucket 17a is moved frowardly (i.e. in the case of a backhoe or trackhoe toward the main body of the backhoe or trackhoe) so that the splitting plate 20a slides over the top of the stump 52a and so that the saw blade 350 cuts a vertical kerf into the top of the stump 52a. It has been found that in many instances, a full kerf is able to be cut with one pass of the saw blade 350 through the stump 52a. In other instances, to obtain the full desired depth of kerf, it may be necessary to make two passes of the saw plate 350 through the stump 52a. The bottom of the kerf is indicated by the broken line 402 in FIG. 29.

After the kerf has been cut, then the bucket 17a is again moved so that its front end is adjacent to the stump, and the forward edge 44a of the splitting plate 20a is aligned with the kerf and moved through the stump 52a. As the splitting plate 20a continues moving through the stump 52a so as to split the stump 52a apart, the saw plate 350 also moves through the stump to a level below the kerf at 402. Thus, if portions of the stump still remain interconnected between the two halves and are still in the path of the saw plate 350, the saw plate 350 will also sever these and further assist in the splitting of the stump 52a.

Figure 31:
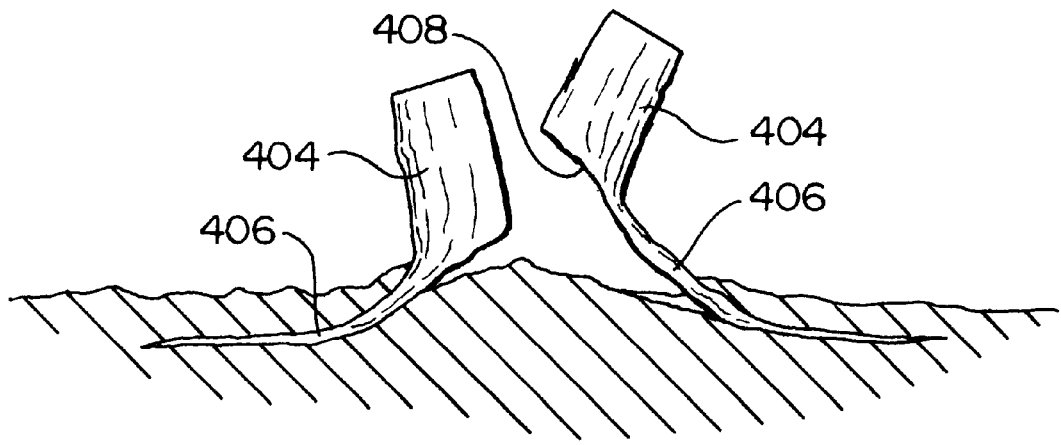
FIGS. 31 and 32 are views, partly in sections, showing first (in FIG. 31) the manner in which a stump can be split and removed in accordance with the present invention, and showing in 32 the manner in which a stump would be removed from the ground in accordance with prior art.
Figure 32:
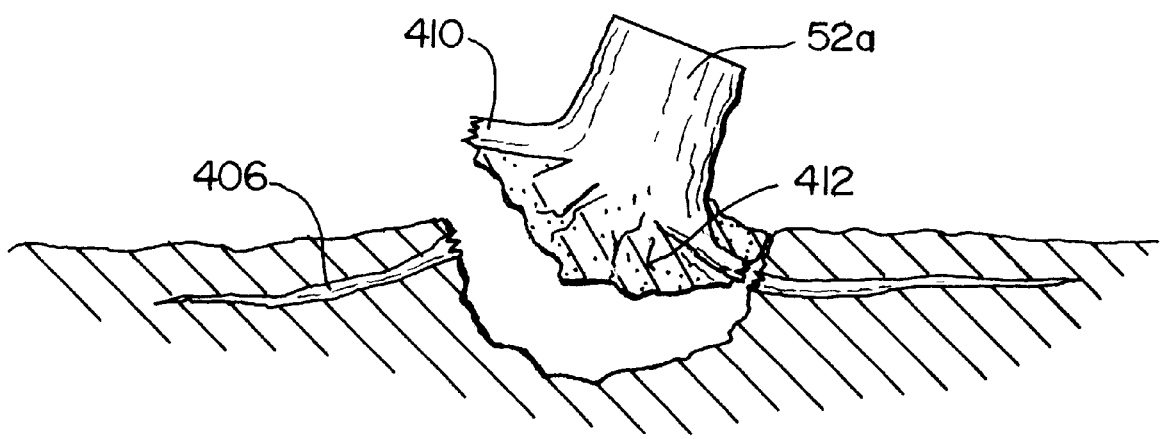

After the splitting is accomplished, then the method of utilizing the present invention proceeds in generally the same manner as described previously in this text. More specifically, the bucket 17a is used to dig around the stump, break through the roots, and lift the stump sections out of the earth. Another desirable feature of the present invention is illustrated in FIGS. 31 and 32. In FIG. 31, the stump 52a is shown having been separated into two pieces 404, with the roots 406 extending laterally outwardly from the stump pieces 404. As shown in FIG. 31, there is little dirt located adjacent to the lower surfaces 408 of the two stump pieces 404.

With reference to FIG. 32, there is shown a full stump 52a being pulled out of the ground. It can be seen that the inside portions 410 of the roots 406 that are closer to the stump 52a still remain connected to the stump. However, in contrast to what is shown in FIG. 31, these root sections tend to carry with them a mass of earth 412 positioned below the stump 52a. Quite often, this collected earth 412 is a mixture of dirt and rocks. In disposing of the various stumps 52a (e.g. carrying these to a disposal site), this extra amount of dirt and rocks 412 add substantial weight, (and thus substantial cost) to the stump disposal operation.

The use of the present invention in accomplishing the splitting removal of stumps, as shown in 31, provides a number of advantages, among these being the following:

a. it increases payload capacity of the stump pieces carried away, since the small pieces fit together more tightly;

b. with the smaller stump pieces, these will burn more quickly;

c. if these stumps are disposed of by grinding or chipping, this can be accomplished more quickly and with cleaner chips;

d. the time takes to remove the stump from the ground can be reduced by as much as one half or greater.

Figure 33:
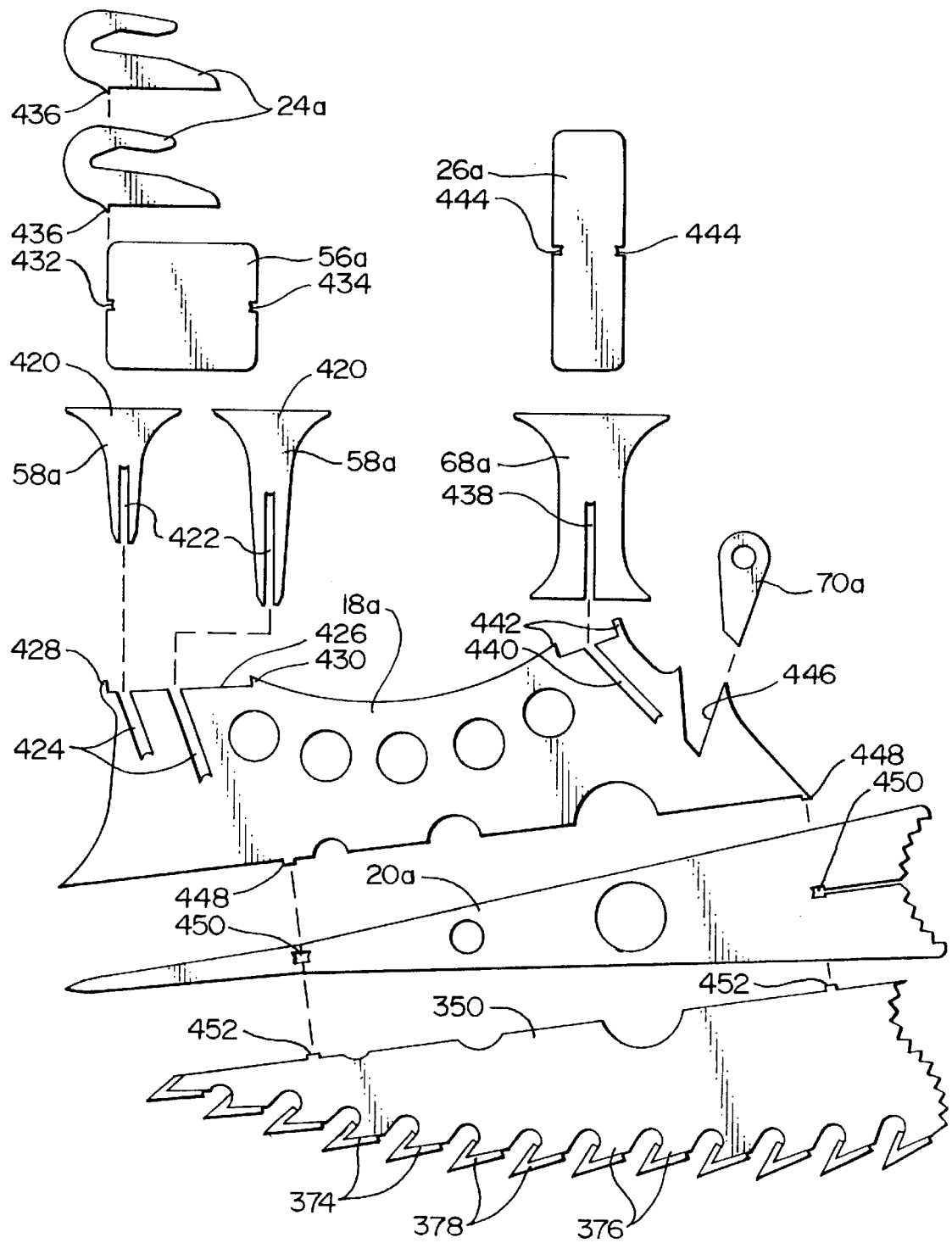
FIG. 33 is a view showing the various components of this second main embodiment in plan view, separated from one another and also illustrating the manner of attachment of these components.

Another feature of the present invention will now be described with reference to FIG. 33. Further development of the present invention has resulted in a design of the separate components of the attachment so that these not only serve the structural and operational functions of the present invention, but also enable the attachment 12a of the present invention to be assembled economically and reliably. FIG. 30 is an exploded view showing the various components in their pre-assembled position. Thus, it can be seen there are the hook members 24a, the forward mounting plate 56a, the forward bracing plates 58a, the rear positioning plate 26a, the rear bracing plate member 68a, the attaching device 70a, the main plate 18a, the splitter plate 20a, and the saw plate 350. Most of these components can be formed by cutting them out for steel plate. However, the two hooks 24a, the attaching device 70a, and the caps 378 would likely be formed in some other manner, such as casting.

One sequence of assembling these components which has found to be quite effective is as follows. First, the main plate 18a is clamped in a vise with its upper side facing upwardly. Each of the two bracing plates 58a is made as a single member, each having an upper expanded portion 420, which tapers inwardly in a downward direction. At a location a little above the mid-length of each bracing plate 420, there is a downwardly open central slot 422 having approximately the same thickness as the main plate 18a.

The forward upper edge of the main plate 18a is formed with a pair of vertically aligned, moderately slanted recesses 424, and first one bracing plate 58a is lowered into engagement with the front portion of the main plate 18a by its upper expanded portion 420 being positioned within its related slot 424, and the with the slot 422 fitting on opposite sides of the main plate 18a. Then that bracing plate 58a is welded in place. After that, the other bracing plate 58a is placed in position with its related slot 424 and into engagement with the main plate 18a, and also welded.

The slots 422 and 424 are selected, along with the other dimensions, so that with the plates 58a in place, the upper edge of the plates 58a are at the same horizontal level as the upper forward edge portion 426 of the main plate 18a. It will be noted that just forwardly of the upper edge 426 there is a small upper protrusion 428 in the main plate, and also a small rear protrusion 430. These two protrusions 428 and 430 are arranged to interfit with matching notches 432 and 434 of the mounting plate 56a. The mounting plate 56a is placed on to the top edge portion 426 of the main plate 18a, interfitting with the protrusions 428 and 430, so that the plate 56a is properly located. It likewise is welded into place.

The hooks 24a are placed on top of the plate 56a and welded in place. It will be noted that the lower part of the two hooks have small downward protrusions 436 to position these on the plate 56a.

The next step is to mount the bracing plate 68a and also the rear positioning plate 26a. The bracing plate 68a has a downwardly extending slot 438, and the main plate 18a has an upwardly and forwardly slanting open slot 440. The plate 68a is moved into engagement with the main plate 18a in the same manner as the bracing plates 58a, with the slot 438 reaching over the main plate at the location downward of the bottom of the slot 440, and with the slot 440 receiving the upper part of the bracing plate 68a. There are upstanding protrusions 442 which interfit with notches 444 in the plate 26a to properly locate the plate 26a. The bracing plate 68a and the plate 26a are welded together, and also welded to the main plate 18a.

The rear edge portion of the main plate 18a is formed with a notch 446 which receives the attaching member 70a. This member 70a is placed in the notch 446 and welded to the main plate 18a.

With the foregoing being accomplished, the main plate 18a with the components welded thereto, as indicated above, is inverted and placed on a flat surface, with the hooks 24a and the plate 26a properly supporting the main plate 18a. The next step is to mount the splitting plate 20a to the lower edge of the main plate 18a. It will be noted that the lower edge of the main plate 18a has forward and rear downwardly extending fingers or protrusions 448 which are able to fit into the upper part of through openings 450 in the splitting plate 20a. The splitting plate 20a is placed on the lower edge of the main plate 18a with the splitting plate 20a being properly aligned and positioned with the interengagement of the protrusions 448 in the openings 450. The splitter plate 20a is then welded to the main plate 18a.

Next, the saw plate 350 is mounted to the bottom side of the splitter plate 20a and welded to form the final assembly. The upper edge of the splitter plate 350 has a pair of notches 452, and these fit into the lower part of the through openings 450, thus properly locating and aligning the saw plate 350. Then the saw plate 350 is welded to the lower side of the splitting plate 20a. Obviously the sequence of joining these components together can be varied.

Figure 34:
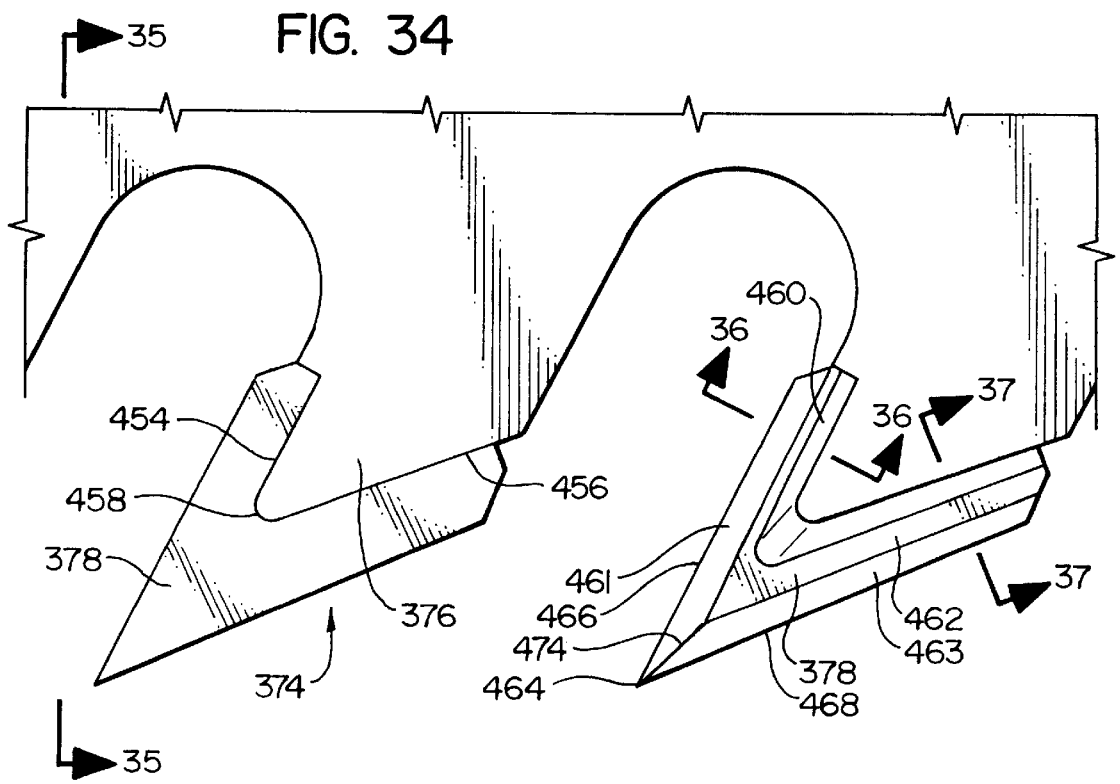
FIG. 34 is a side elevational view, drawn to an enlarged scale relative to the other Figures, showing in more detail the saw teeth.
Figure 35:
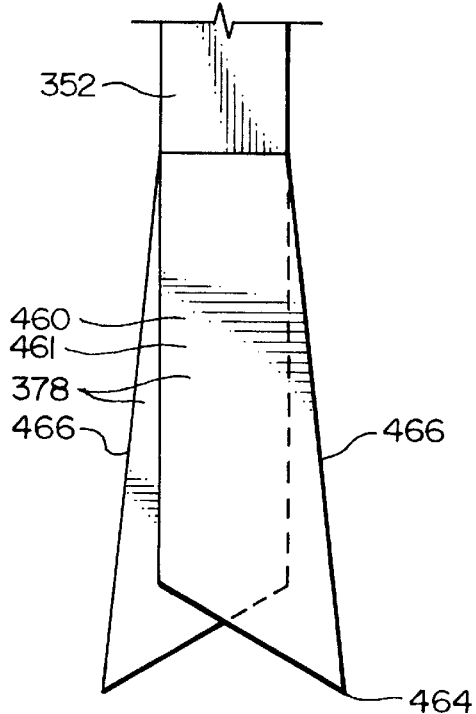
FIG. 35 is a view taken from the location at 35—35 of FIG. 34.
Figure 36:
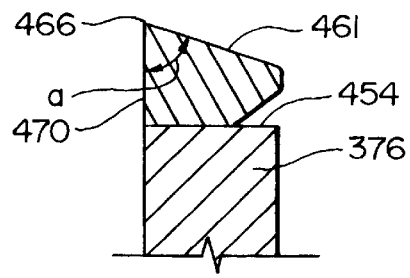
FIG. 36 is a sectional view taken along 36—36 of FIG. 34.
Figure 37:
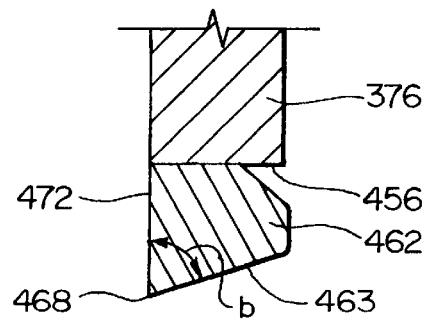
FIG. 37 is a sectional view taken along line 37—37 of FIG. 34.

FIGS. 34 through 36 illustrate the configuration of the saw teeth in more detail. As indicated previously, each tooth 374 comprises a stub 376 and a cap or replaceable tooth portion 378. Each stub 376 has a downwardly and forwardly slanting surface 454, and an upwardly and rearwardly slanting lower surface 456. These meet at a rounded connecting area 458.

Each cap or replaceable tooth portion 378 comprises a forward arm portion 460 having a forward working surface 461, and a second arm portion 462 having a downwardly facing working surface 463.

The surface 460 has a leading cutting edge 466, and the surface 462 has a lower cutting edge 468, these meeting at the aforementioned point 464.

The forward working surface 461 meets an adjacent side wall 470 at the edge 466 making an angle (indicated at "a") of approximately 74°. In like manner the working surface 463 joins an adjacent side wall 472 of its arm portion 462 at an angle (indicated at "b") also of about 74°. Obviously, these angles could be varied, depending upon a number of factors. These two surfaces 461 and 463 meet at the aforementioned point 464 and also meet along a forward cutting edge 474.

With reference to FIG. 35, it can be seen that the orientation of the replaceable cutting portions 378 are slanted laterally outwardly a moderate distance relative to the vertical center plane of the main saw plate 452, this being done in an alternate fashion, so that each pair of adjacent replaceable saw tip portions 478 extend laterally in opposite directions. Thus, it can be seen in FIG. 35 that the forward surface of 461 of the forward arm portion 460 has its lateral cutting edge 466 extending downwardly and outwardly in one direction to its tip at 464, and the surface 461 of the next forward arm portion extends laterally in a downward and forward direction to obtain this outward downward slant in an opposite direction. Thus, the teeth 374 cut a kerf which is between one and one half to two times larger than the width of the saw plate 352.

As these replaceable tooth portions 478 wear, these can, of course, be sharpened. When the wear becomes substantial, then the replaceable tooth portions 378 can be removed and replaced. These replaceable tooth portions 378 are normally welded to its related cap 376.

As these replaceable tooth portions 478 wear, these can, of course, be sharpened. When the wear becomes substantial, then the replaceable tooth portions 378 can be removed and replaced. These replaceable tooth portions 378 are normally welded to its related cap 376.

In interpreting the following claims, in the broader sense, the term "backhoe" shall include a trackhoe (where the machine is mounted on tracks), a backhoe where the machine is mounted on wheels, and also other machines which have an earth penetrating and/or digging member which can be operated in a manner to accomplish the function of the present invention and have the splitting means attached thereto, such as a backrake.

Further, within the broader scope of the present invention, one of the advantages and unique features of the present invention is that a conventional piece of equipment, such as a backhoe or trackhoe, already having a digging member with manipulating ability can be readily adapted by incorporating the present invention as an attachment which can be removably mounted. Of course, it is to be recognized that if a machine is to be totally dedicated toward the stump splitting and removal operation, the splitting attachment could be permanently attached to the bucket or other earth moving member or be initially incorporated in the machine at the time of manufacture.

Therefore, it is obvious that various modifications and adaptations could be made to the present invention without departing from the basic teachings thereof, and the claims are to be given the broadest interpretation compatible with the limitations of the prior art so that the components recited in the claims would not be interpreted within a narrow definition that might be given to specific terminology, but also would apply to components or members which perform the basic and/or broad functions of these members.

It is obvious that various modification could be made to the present invention without departing from the basic teachings thereof.

What is claimed:

1. A method to split and dislodge a tree stump from its ground embedded position, where the stump has an upper stump portion and a root system comprising roots extending from the upper stump portion into surrounding ground strata adjacent to the upper stump portion, said method comprising:

a. providing a stump splitting and dislodging assembly comprising a stump splitting means having a leading edge and side splitting surface portions extending rearwardly from said leading edge and also comprising a stump dislodging means having a ground penetrating portion;

b. positioning and moving the stump splitting means of the assembly means to cause said leading edge to engage the upper stump portion and to split said upper stump portion along a substantially vertical splitting plane;

c. after the upper stump portion is split, then positioning and moving said dislodging means to penetrate into said surrounding ground strata and sever said roots and/or separate said roots from said surrounding ground strata and thus dislodge said stump from its ground embedded engagement in said earth strata.

2. The method as recited in claim 1, wherein said splitting means is positioned below said stump dislodging means and fixedly connected thereto, said method further comprising moving said splitter means through said upper stump portion in a splitting motion, with said dislodging means being above said upper stump portion.

3. The method as recited in claim 2, further comprising providing an operating arm means, and rotatably mounting said dislodging means and said splitting means to said arm means, rotating said dislodging means and said arm means as an assembly between a splitting position where said splitting means has a substantial horizontal alignment component, and a dislodging position where said dislodging means is oriented to penetrate into the ground strata.

4. An apparatus to split and dislodge a tree stump from its ground embedded position, where the stump has an upper stump portion and a root system comprising roots extending from the upper stump portion into surrounding ground strata adjacent to the upper stump portion, said apparatus comprising:

a. a stump splitting and dislodging assembly having a forward end, a rear end, a horizontally aligned lengthwise axis extending from the front end to the rear end, and upper and lower locations, said assembly comprising:

i. a stump splitting means positioned at a lower location in said assembly and having a leading edge and generally horizontally aligned side splitting surface portions extending from said leading edge, said leading edge being positioned in the assembly to engage the upper stump portion in splitting engagement while the stump is in its ground embedded position, and to split through said upper stump portion along a substantially vertical splitting plane, while the stump, including the upper stump portion, is still in its ground embedded position;

ii. a stump dislodging means connected to, and positioned above said stump splitting means in a manner that when said splitting means is splitting said upper stump portion, while the stump is in the ground, the dislodging means is out of obstructing engagement with the stump, said stump dislodging means having an earth penetrating edge portion positioned in said assembly and configured to penetrate into said surrounding ground strata while said stump is still in its ground embedded position to sever said roots and/or separate said roots from said surrounding ground strata, and thus to dislodge said stump as separate stump portions from ground embedded engagement in said earth strata;

b. an assembly operating means having operating engagement with said stump splitting and dislodging assembly to move said assembly under power to cause said splitting means to split said upper stump portion and to cause said stump dislodging means to penetrate the surrounding ground strata and dislodge said stump from ground engagement.

5. The assembly as recited in claim 4, wherein said operating means comprises an operating arm means, and said stump splitting and displacing assembly is rotatably mounted to said operating arm means, in a manner that said assembly can be rotated between a splitting position where said splitting means is aligned along substantial horizontal alignment component, and a dislodging position where the earth penetrating edge portion of said dislodging means is positioned to be directed more downwardly and oriented to penetrate into the ground strata.

6. A splitting attachment for an earth moving machine which has an earth engaging member having a front digging end portion adapted to dig into ground strata, and a rear end, and manipulating means to position and move said earth engaging member, said splitting attachment being arranged to enable the machine to split and dislodge a tree stump from its ground embedded position, where the stump has an upper stump portion and a root system comprising roots extending from the upper stump portion into surrounding ground strata adjacent to the upper stump portion, said attachment comprising:

a. a stump splitting means having a leading edge and side splitting surface portions extending rearwardly from said leading edge;

b. an attaching means to operatively attach said stump splitting means to a lower side of said earth engaging means in a manner to position said splitting means relative to said earth moving means so that the leading edge of the stump splitting means is below and rearwardly of the front digging edge portion to enable said splitting means to move through said upper stump portion to split said upper stump portion and to enable said earth engaging member to penetrate the surrounding ground strata and dislodge said stump from ground engagement with said splitting means attached to said earth moving means.

7. The attachment as recited in claim 6, wherein said attaching means is arranged to position said splitting means with a substantial splitting alignment component of the splitting means being horizontal whereby said splitting means is positioned to be able to move through said upper stump portion in a splitting motion, with said earth engaging member being above said upper stump portion.

8. A method to split and dislodge a tree stump from its ground embedded position, where the stump has an upper stump portion and a root system comprising roots extending from the upper stump portion into surrounding ground strata adjacent to the upper stump portion, said method comprising:

a. providing a stump splitting and dislodging assembly comprising a stump splitting means having a leading edge and side splitting surface portions extending rearwardly from said leading edge;

b. positioning and moving the stump splitting means to cause said leading edge to engage the upper stump portion and to split said upper stump portion along a substantially vertical splitting plane;

c. also providing as part of said assembly a stump dislodging means having a ground penetrating portion;

d. positioning and moving said dislodging means to penetrate into said surrounding ground strata and sever said roots and/or separate said roots from said surrounding ground strata and thus dislodge said stump from its ground embedded engagement in said earth strata;

e. said dislodging means comprising bucket means having a lower wall means and containing side wall means defining with said lower wall means a containing area, and having a ground digging edge means adjacent to said lower wall means, said bucket being operatively connected to an operating arm means, said method further comprising detachably mounting said splitting means adjacent to said bucket means.

9. The method as recited in claim 8, further comprising providing backhoe means which in turn comprises said arm means and said bucket means, said method comprising operating said backhoe means to move said splitting means to split said upper stump portion and to move the dislodging means to dislodge said stump in sections.

10. The method as recited in claim 9, further comprising providing saw plate means operatively connected to the assembly comprising said splitting means and said dislodging means, said method further comprising positioning a cutting edge of said saw plate means downwardly and moving said saw plate means through said upper stump portion in sawing engagement therewith to form a kerf in said upper stump portion, and then moving the splitting means through the kerf in said upper stump portion to split the upper stump portion.

11. A method to split and dislodge a tree stump from its ground embedded position, where the stump has an upper stump portion and a root system comprising roots extending from the upper stump portion into surrounding ground strata adjacent to the upper stump portion, said method comprising:

a. providing a stump splitting and dislodging assembly comprising a stump splitting means having a leading edge and side splitting surface portions extending rearwardly from said leading edge;

b. further providing saw plate means operatively connected to the assembly, and positioning a cutting edge of said saw plate means downwardly and moving saw plate means through said upper stump portion in sawing engagement therewith, to form a kerf in said upper stump portion;

c. also positioning and moving the stump splitting means to cause said leading edge to engage the upper stump portion and to split said upper stump portion along a substantially vertical splitting plane;

d. also providing as part of said assembly a stump dislodging means having a ground penetrating portion;

e. positioning and moving said dislodging means to penetrate into said surrounding ground strata and sever said roots and/or separate said roots from said surrounding ground strata and thus dislodge said stump from its ground embedded engagement in said earth strata.

12. An apparatus to split and dislodge a tree stump from its ground embedded position, where the stump has an upper stump portion and a root system comprising roots extending from the upper stump portion into surrounding ground strata adjacent to the upper stump portion, said apparatus comprising:

a. a stump splitting and dislodging assembly having a forward end, a rear end, a lengthwise axis extending from the front end to the rear end, and upper and lower locations, said assembly comprising:
    i. a stump splitting means having a leading edge and side splitting surface portions extending rearwardly from said leading edge, said leading edge being positioned in the assembly to engage the upper stump portion in splitting engagement while the stump is in its ground embedded position, and to split through said upper stump portion along a substantially vertical splitting plane, while the stump, including the upper stump portion, is still in its ground embedded position;
    ii. a stump dislodging means connected to said stump splitting means, said stump dislodging means having an earth penetrating edge portion positioned in said assembly and configured to penetrate into said surrounding ground strata while said stump is still in its ground embedded position to sever said roots and/or separate said roots from said surrounding ground strata, and thus as dislodge said stump as separate stump portions from ground embedded engagement in said earth strata;
  b. an assembly operating means having operating engagement with said stump splitting and dislodging assembly to move said assembly under power to cause said splitting means to split said upper stump portion and to cause said stump dislodging means to penetrate the surrounding ground strata and dislodge said stump from ground engagement;
  c. said dislodging means comprising bucket means having a lower wall means and side containing wall means defining with said lower wall means a containing area, and having an earth digging edge means adjacent to said lower wall means, said bucket means being arranged and operatively connected to said operating means to enable said digging edge means to dig into portions of the ground strata with said portions of the ground strata being directed into the containing area of the bucket means.

13. The apparatus as recited in claim 12, wherein said splitting means is positioned below said stump dislodging means and fixedly connected thereto, with said splitting means having a substantial alignment component parallel to the lengthwise axis of the assembly, whereby said splitter means is positioned to be able to move through said upper stump portion in a splitting motion, with said dislodging means being above said upper stump portion.

14. The assembly as recited in claim 13, wherein said operating means comprises an operating arm means, and said stump splitting and displacing assembly is rotatably mounted to said operating arm means, in a manner that said assembly can be rotated between a splitting position where said splitting means is aligned along substantial horizontal alignment component, and a dislodging position where said dislodging means is positioned and oriented to penetrated into the ground strata.

15. The apparatus as recited in claim 12, wherein said splitting means has detachable mounting means by which said splitting means can be detachably adjacent to said bucket means.

16. The apparatus as recited in claim 15, wherein said mounting means is arranged so that said splitting means is removably mounted adjacent to said lower wall means, and said splitting means further comprises a splitting plate means which is fixedly attached to said mounting means to be spaced below said bucket and to extend along said lengthwise axis.

17. The apparatus as recited in claim 16, further comprising saw plate means mounted to said stump splitting and dislodging assembly and having a downwardly facing cutting edge which is positioned in the assembly to be moved through said upper stump portion in sawing engagement.

18. The apparatus as recited in claim 17, wherein said saw plate means extends downwardly from said splitting plate means, whereby said saw plate means can be passed through the upper stump portion in sawing engagement, with said splitting plate means passing over said upper stump portion.

19. An apparatus to split and dislodge a tree stump from its ground embedded position, where the stump has an upper stump portion and a root system comprising roots extending from the upper stump portion into surrounding ground strata adjacent to the upper stump portion, said apparatus comprising:

a. a stump splitting and dislodging assembly having a forward end, a rear end, a lengthwise axis extending from the front end to the rear end, and upper and lower locations, said assembly comprising:
    i. a stump splitting means having a leading edge and side splitting surface portions extending rearwardly from said leading edge, said leading edge being positioned in the assembly to engage the upper stump portion in splitting engagement while the stump is in its ground embedded position, and to split through said upper stump portion along a substantially vertical splitting plane, while the stump, including the upper stump portion, is still in its ground embedded position;
    ii. a stump dislodging means connected to said stump splitting means, said stump dislodging means having an earth penetrating edge portion positioned in said assembly and configured to penetrate into said surrounding ground strata while said stump is still in its ground embedded position to sever said roots and/or separate said roots from said surrounding ground strata, and thus as dislodge said stump as separate stump portions from ground embedded engagement in said earth strata;
  b. an assembly operating means having operating engagement with said stump splitting and dislodging assembly to move said assembly under power to cause said splitting means to split said upper stump portion and to cause said stump dislodging means to penetrate the surrounding ground strata and dislodge said stump from ground engagement;
  c. said operating means comprises backhoe means which in turn comprises an arm means and a bucket which comprises said stump dislodging means and which is rotatably connected to said arm means, a bucket manipulating means which rotates said bucket about said arm means, and power means to move said arm means to in turn move said assembly and also rotate said assembly, said splitting means being connected to said bucket means.

20. An apparatus to split and dislodge a tree stump from its ground embedded position, where the stump has an upper stump portion and a root system comprising roots extending from the upper stump portion into surrounding ground strata adjacent to the upper stump portion, said apparatus comprising:

a. a stump splitting and dislodging assembly having a forward end, a rear end, a lengthwise axis extending from the front end to the rear end, and upper and lower locations, said assembly comprising:
   i. a stump splitting means having a leading edge and side splitting surface portions extending rearwardly from said leading edge, said leading edge being positioned in the assembly to engage the upper stump portion in splitting engagement while the stump is in its ground embedded position, and to split through said upper stump portion along a substantially vertical splitting plane, while the stump, including the upper stump portion, is still in its ground embedded position;
   ii. a stump dislodging means connected to said stump splitting means, said stump dislodging means having an earth penetrating edge portion positioned in said assembly and configured to penetrate into said surrounding ground strata while said stump is still in its ground embedded position to sever said roots and/or separate said roots from said surrounding ground strata, and thus to dislodge said stump as separate stump portions from ground embedded engagement in said earth strata;
b. an assembly operating means having operating engagement with said stump splitting and dislodging assembly to move said assembly under power to cause said splitting means to split said upper stump portion and to cause said stump dislodging means to penetrate the surrounding ground strata and dislodge said stump from ground engagement;
c. a saw means which is operatively connected to said stump splitting and dislodging assembly to be moved through said upper stump portion in sawing engagement while said stump is in its ground embedded position, along a substantially vertical sawing plane to form a kerf through which the splitting means can be moved.

21. A splitting attachment for an earth moving machine which has an earth engaging member adapted to dig into ground strata, and manipulating means to position and move said earth engaging member to enable the machine to split and dislodge a tree stump from its ground embedded position, where the stump has an upper stump portion and a root system comprising roots extending from the upper stump portion into surrounding ground strata adjacent to the upper stump portion, said attachment comprising:
   a. a stump splitting means having a leading edge and side splitting surface portions extending rearwardly from said leading edge;
   b. an attaching means to operatively attach said stump splitting means to said earth engaging means in a manner to position said splitting means relative to said earth moving means to enable said splitting means to move through said upper stump portion to split said upper stump portion and to enable said earth engaging member to penetrate the surrounding ground strata and dislodge said stump from ground engagement with said splitting means attached to said earth moving means;
   c. said attachment being arranged to be utilized with backhoe means which in turn comprises an arm means and a bucket which comprises said earth engaging member and which is rotatably connected to said arm means, a bucket manipulating means which rotates said bucket about said arm means, and power means to move said arm means to in turn move said assembly and also rotate said assembly, said attachment means being arranged to detachably mount the splitting means adjacent to said bucket, said splitting means further comprising a splitting plate means which is fixedly attached to said mounting means to be spaced below said bucket.

22. The attachment as recited in claim 21, further comprising saw plate means which extends downwardly from said splitting plate means with downwardly facing saw teeth, whereby said saw blade means can be passed through the upper stump portion in sawing engagement, with said splitting plate means passing over said upper stump portion.

23. A splitting attachment for an earth moving machine which has an earth engaging member adapted to dig into ground strata, and manipulating means to position and move said earth engaging member to enable the machine to split and dislodge a tree stump from its ground embedded position, where the stump has an upper stump portion and a root system comprising roots extending from the upper stump portion into surrounding ground strata adjacent to the upper stump portion, said attachment comprising:
   a. a stump splitting means having a leading edge and side splitting surface portions extending rearwardly from said leading edge;
   b. an attaching means to operatively attach said stump splitting means to said earth engaging means in a manner to position said splitting means relative to said earth moving means to enable said splitting means to move through said upper stump portion to split said upper stump portion and to enable said earth engaging member to penetrate the surrounding ground strata and dislodge said stump from ground engagement with said splitting means attached to said earth moving means;
   c. saw plate means having a downwardly facing cutting edge which is positioned to be moved through said upper stump portion in sawing engagement.

24. The attachment as recited in claim 21, wherein said attaching means comprises a front attaching portion adapted to attached to a front end of the bucket and rear attaching means to attach to a rear end of the bucket.

25. Thee attachment as recited in claim 24, wherein said front attaching means comprises hook means to engage a front edge portion of the bucket.

26. The attachment as recited in claim 25, wherein said rear attaching means comprises adjustable attaching means which can be adjusted to achieve proper attaching engagement of the attachment.

27. The attachment as recited in claim 24, wherein said rear attaching means comprises adjustable attaching means which can be adjusted to achieve proper attaching engagement of the attachment.

* * * * *